United States Patent
Fullerton et al.

(10) Patent No.: US 7,046,187 B2
(45) Date of Patent: May 16, 2006

(54) SYSTEM AND METHOD FOR ACTIVE PROTECTION OF A RESOURCE

(75) Inventors: Larry W. Fullerton, Owens Crossroads, AL (US); Mark D. Roberts, Huntsville, AL (US); James L. Richards, Fayetteville, TN (US)

(73) Assignee: Time Domain Corporation, Huntsville, AL (US)

( * ) Notice: Subject to any disclaimer, the term of this patent is extended or adjusted under 35 U.S.C. 154(b) by 0 days.

(21) Appl. No.: 10/991,305

(22) Filed: Nov. 17, 2004

(65) Prior Publication Data

US 2006/0028373 A1    Feb. 9, 2006

Related U.S. Application Data

(60) Provisional application No. 60/599,428, filed on Aug. 6, 2004.

(51) Int. Cl.
*G01S 13/88* (2006.01)
*G01S 13/00* (2006.01)

(52) U.S. Cl. .................... 342/54; 342/21; 342/27; 342/28; 342/52; 342/59; 342/61; 342/67; 342/73; 342/74; 342/118; 342/146; 342/147; 342/158; 342/175; 342/195; 89/1.11

(58) Field of Classification Search ............... 342/21, 342/52–59, 61, 67, 25 R–25 F, 60, 73–81, 342/89–103, 118, 146, 147, 156–158, 175, 342/195, 22; 89/1.11; 244/3.1–3.3
See application file for complete search history.

(56) References Cited

U.S. PATENT DOCUMENTS

| | | | | |
|---|---|---|---|---|
| 3,076,961 A | * | 2/1963 | Bibbero | 342/53 |
| 3,427,611 A | * | 2/1969 | Enenstein | 342/54 |
| 3,714,898 A | * | 2/1973 | Ziemba | 342/54 |
| 3,754,249 A | * | 8/1973 | Kearney, II | 342/54 |
| 3,798,795 A | * | 3/1974 | Michelsen | 342/55 |
| 3,981,010 A | * | 9/1976 | Michelsen | 342/55 |
| 3,992,708 A | * | 11/1976 | Olson et al. | 342/52 |
| 4,641,317 A | | 2/1987 | Fullerton | |
| 4,813,057 A | | 3/1989 | Fullerton | |
| 4,979,186 A | | 12/1990 | Fullerton | |
| 5,130,713 A | * | 7/1992 | Wagner | 342/54 |
| 5,363,108 A | | 11/1994 | Fullerton | |
| 5,677,927 A | | 10/1997 | Fullerton et al. | |
| 5,687,169 A | | 11/1997 | Fullerton | |
| 5,764,696 A | | 6/1998 | Barnes et al. | |
| 5,781,147 A | * | 7/1998 | Elliott et al. | 342/54 |
| 5,812,081 A | | 9/1998 | Fullerton | |

(Continued)

OTHER PUBLICATIONS

Jim Wilson, "Weapons of the Insurgents", Popular Mechanics, Mar. 2004.

(Continued)

*Primary Examiner*—Bernarr E. Gregory
(74) *Attorney, Agent, or Firm*—James Richards

(57) ABSTRACT

An active protection system comprising an ultrawideband radar for threat detection, an optical tracker for precision threat position measurement, and a high powered laser for threat kill or mitigation. The uwb radar may use a sparse array antenna and may also utilize Doppler radar information. The high powered laser may be of the optically pumped solid state type and in one embodiment may share optics with the optical tracker. In one embodiment, the UWB radar is used to focus the high power laser. Alternative interceptor type kill mechanisms are disclosed. In a further embodiment, the kill mechanism may be directed to the source of the threat.

32 Claims, 17 Drawing Sheets

U.S. PATENT DOCUMENTS

| | | | |
|---|---|---|---|
| 5,832,035 | A | 11/1998 | Fullerton |
| 5,952,956 | A | 9/1999 | Fullerton |
| 5,969,663 | A | 10/1999 | Fullerton et al. |
| 6,064,330 | A * | 5/2000 | Elliott et al. .................. 342/54 |
| 6,177,903 | B1 | 1/2001 | Fullerton et al. |
| 6,218,979 | B1 | 4/2001 | Barnes et al. |
| 6,400,307 | B1 | 6/2002 | Fullerton et al. |
| 6,614,384 | B1 | 9/2003 | Hall et al. |
| 6,653,971 | B1 * | 11/2003 | Guice et al. .................. 342/54 |
| 6,667,724 | B1 | 12/2003 | Barnes et al. |
| 6,853,328 | B1 * | 2/2005 | Guice et al. .................. 342/54 |

OTHER PUBLICATIONS

Author Unknown, "Protection Systems for Modern Armoured Vehicles", Defense-Update.com, Jun. 30, 2004.

Author Unknown, "Full Spectrum Active Protein Close-In Shield (FCLAS)" Defense-Update.com, Jun. 30, 2004.

Author Unknown, Full Spectrum Active Protein (FSAP), Defense-Update.com, Jun. 30, 2004.

Author Unknown, "US Army Active Defense Program", Defense-Update.com, Jun. 30, 2004.

Author Unknown, "Active Protection Systems from Germany", Defense Update.com, Jun. 30, 2004.

Maj. John Del Barga, Dr. Gordon Hager, Dr. Kip Kendrick, "Advances in Chemical Oxygen-Iodine Laser Technology", Directed Energy Directorate, Air Force Research Laboratory. Document DE-01-04, AFRL Technology Horizons Dec. 2001.

Dr. William P. Latham, "Applications of the Chemical Oxygen-Iodine Laser", Directed Energy Directorate, Air Force Research Laboratory. Document DE-99-02, 1999.

* cited by examiner

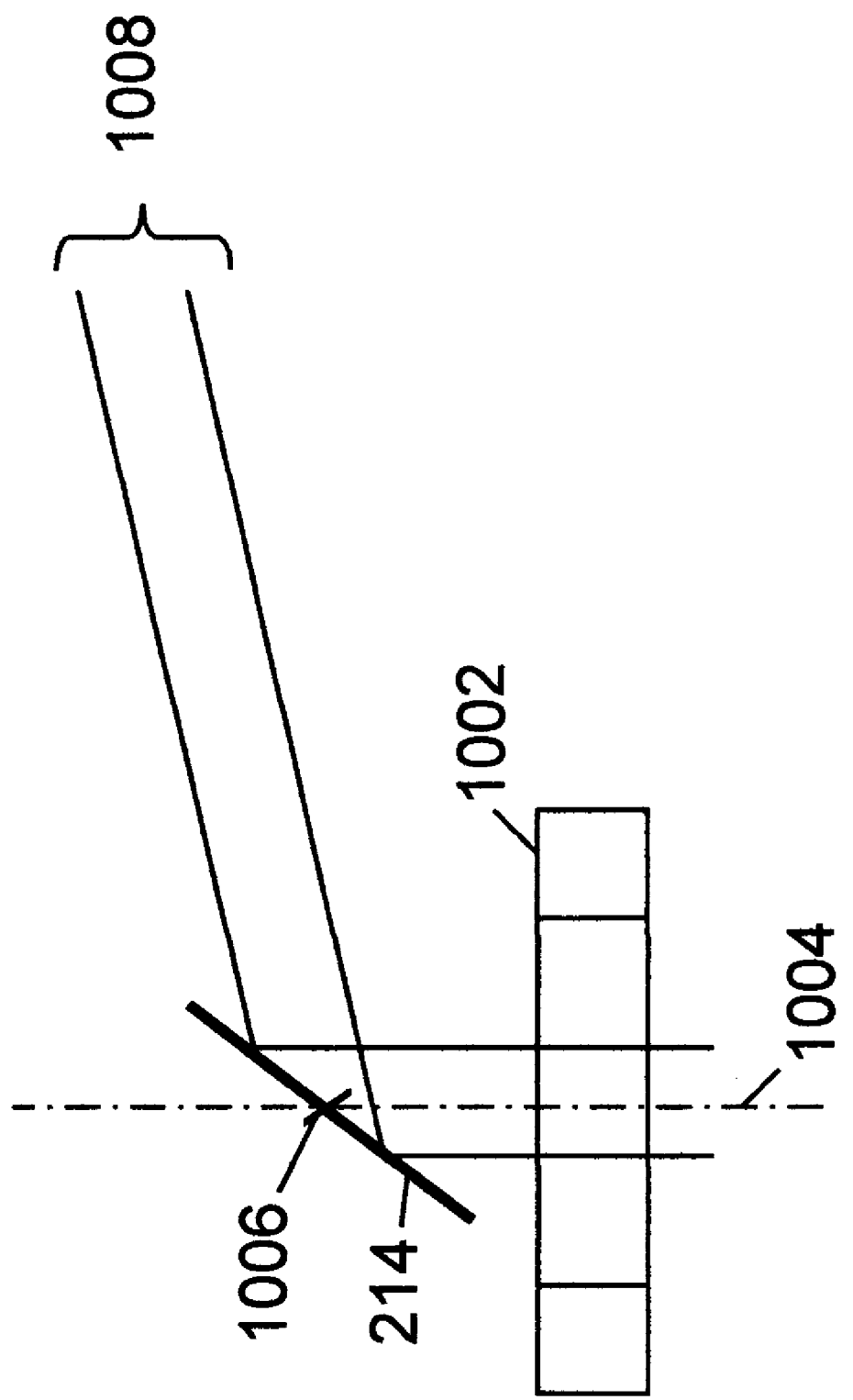

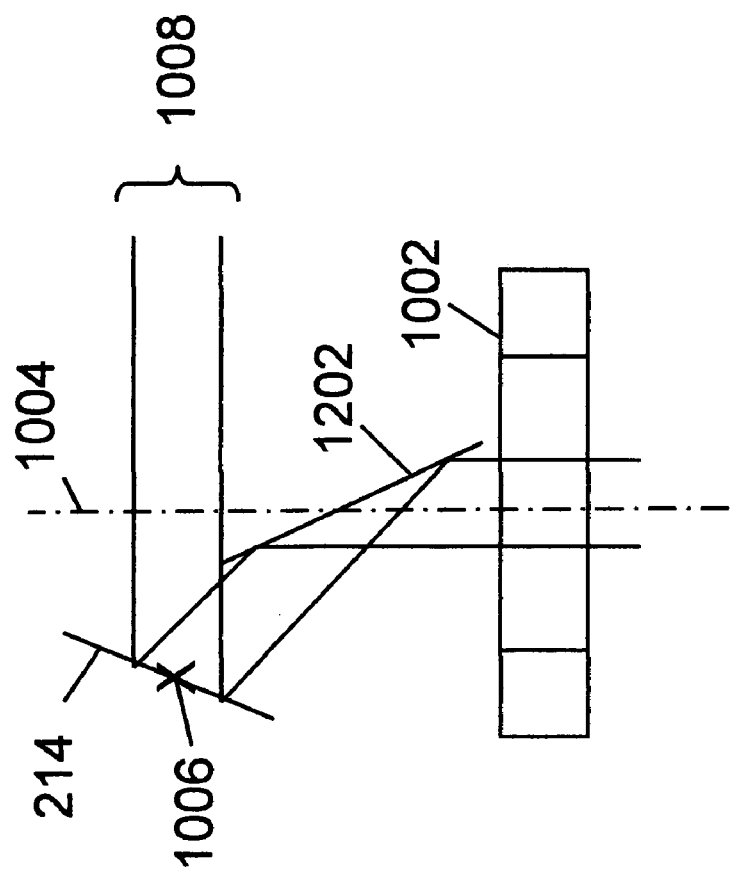
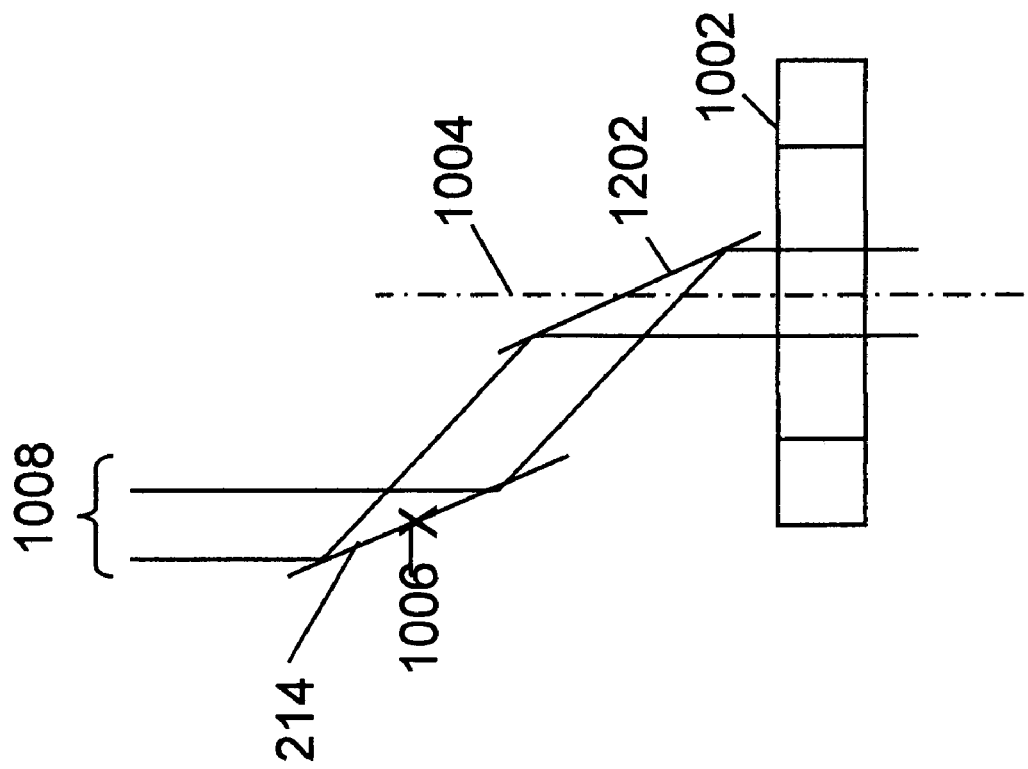
Fig. 12B
Fig. 12A

SYSTEM AND METHOD FOR ACTIVE PROTECTION OF A RESOURCE

BACKGROUND

1. Field of the Invention

The present invention pertains to the field of defense systems, more particularly to the field of active protection systems.

2. Background of the Invention

Modern weapons have become increasingly effective against passive armor, making it impractical to provide enough armor for effective protection. Even composite armor or reactive armor are insufficient against some threats. In particular, one type of Rocket Propelled Grenade (RPG) has a duplex charge that is designed to trigger the reactive armor with the first charge and then penetrate the armor with the second charge.

The RPG is a particularly important threat because it is low cost to produce, can be operated by a single soldier and requires little training or skill to operate. The RPG can be used from 30 meters to 900 meters in range and can effectively kill a tank if properly used. The RPG can be equipped with a number of armor piercing or antipersonnel rounds. It has been stated that half of the US casualties in recent conflicts have been due to RPG's.

Several active protection systems have been proposed to counter RPGs and other similar threats such as missiles and mortar rounds. One such system is the Full Spectrum Active Protection Close-in Shield (FCLAS). The FCLAS uses an X-band radar to detect an incoming RPG and then launches a grenade in the direction of the incoming RPG. The grenade has a side looking proximity fuse that triggers according to the proximity of the RPG and generates a doughnut shaped blast with shrapnel intended to destroy the RPG. The doughnut shaped pattern is along a plane away from the vehicle being protected, keeping the protection shrapnel away from the protected vehicle. Although FCLAS may potentially be effective for certain vehicles in certain maneuvers, it presents considerable hazard to infantry near the protected vehicle, thus the system may not be enabled unless all personnel are in strict positions.

The AWiSS system is another active protection system. The AWiSS employs a rotatable grenade launcher placed atop the vehicle. A radar senses an incoming threat, the grenade launcher is pointed in the direction of the threat, and then the grenade is launched in the direction of the threat to intercept the threat 10 meters from the vehicle. Again, considerable damage may be done to friendly troops while attempting to intercept a threat. The damage is said to be much less than would be done by a direct hit by the threat. Still, the potential for damage to friendly troops places limitations on troop formation and movement and such limitations may impact troop effectiveness. Thus, there is a need for improved active protection system to improve survivability against RPGs and other similar threats without significantly limiting troop formation and movement.

BRIEF DESCRIPTION OF THE INVENTION

Briefly, the present invention is an active protection system comprising an ultra wideband (UWB) radar for threat detection, an optical tracker for precision threat position measurement, and a high powered laser for threat kill or mitigation. The UWB radar may use a sparse array antenna and may also utilize Doppler radar information. The high powered laser may be of the optically pumped solid state type and in one embodiment may share optics with the optical tracker. In one embodiment, the UWB radar is used to focus the high power laser. Alternative interceptor type kill mechanisms are disclosed. In a further embodiment, the kill mechanism may be directed to the source of the threat.

These and further benefits and features of the present invention are herein described in detail with reference to exemplary embodiments in accordance with the invention.

BRIEF DESCRIPTION OF THE DRAWINGS

The invention is described with reference to the following drawings. In the drawings, like numbers represent identical or similar components. The first digits of a reference number identify the drawing number wherein the reference first appears.

FIG. 10 depicts one embodiment of a gimbaled mirror of the system of FIG. 2;

FIGS. 12A and 12B show an alternative embodiment of the gimbaled mirror of FIG. 2;

DETAILED DESCRIPTION OF THE PREFERRED EMBODIMENTS

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art.

UWB Background

Impulse radio has been described in a first series of patents, including U.S. Pat. No. 4,641,317 (issued Feb. 3, 1987), U.S. Pat. No. 4,743,906 (issued May 10, 1988), U.S. Pat. No. 4,813,057 (issued Mar. 14, 1989), U.S. Pat. No. 4,979,186 (issued Dec. 18, 1990), and U.S. Pat. No. 5,363,108 (issued Nov. 8, 1994) to Larry W. Fullerton. A second series of impulse radio patents includes U.S. Pat. No. 5,677,927 (issued Oct. 14, 1997), U.S. Pat. No. 5,687,169 (issued Nov. 11, 1997), U.S. Pat. No. 5,764,696 (issued Jun. 9, 1998), U.S. Pat. No. 5,832,035 (issued Nov. 3, 1998), and U.S. Pat. No. 5,969,663 (issued Oct. 19, 1999) to Fullerton et al, and U.S. Pat. No. 5,812,081 (issued Sep. 22, 1998), and U.S. Pat. No. 5,952,956 (issued Sep. 14, 1999) to Fullerton. The first and second series of impulse radio patents are incorporated herein by reference.

Uses of impulse radio systems are described in U.S. Pat. No. 6,177,903 (issued Jan. 23, 2001) titled, "System and Method for Intrusion Detection using a Time Domain Radar Array", U.S. Pat. No. 6,218,979 (issued Apr. 17, 2001) titled "Wide Area Time Domain Radar Array", and U.S. Pat. No. 6,614,384 (issued Sep. 2, 2003) titled "System and Method for Detecting an Intruder Using Impulse Radio Technology", which are incorporated herein by reference.

Active Protection System

The present invention is a system and method for active protection of a resource. The resource may be a vehicle, a building, a compound, a guard station or other potential target for small missiles and projectiles similar to an RPG or mortar round.

The RPG-7 is a shoulder-fired, muzzle-loaded, antitank and antipersonnel grenade launcher that launches fin-stabilized, oversized grenades from a 40 mm tube. The launcher with optical sights weighs 6.9 kilograms (15.9 pounds) and has a maximum, effective range of 300 meters against moving point targets and 500 meters against stationary point targets. The maximum range for antitank grenades against area targets is 920 meters. The round self-destructs after a 4.5 second flight. The antipersonnel grenades reach over 1100 meters. Among the production grenades are the PG-7, PG-7M, PG-7N, and PG-7VL antitank grenades with armor penetrability of up to 600 mm of rolled homogeneous steel. The PG-7VR is a tandem warhead designed to penetrate explosive reactive armor and the armor underneath. The OG-7 and OG-7M are high-explosive antipersonnel grenades.

Figure 1:
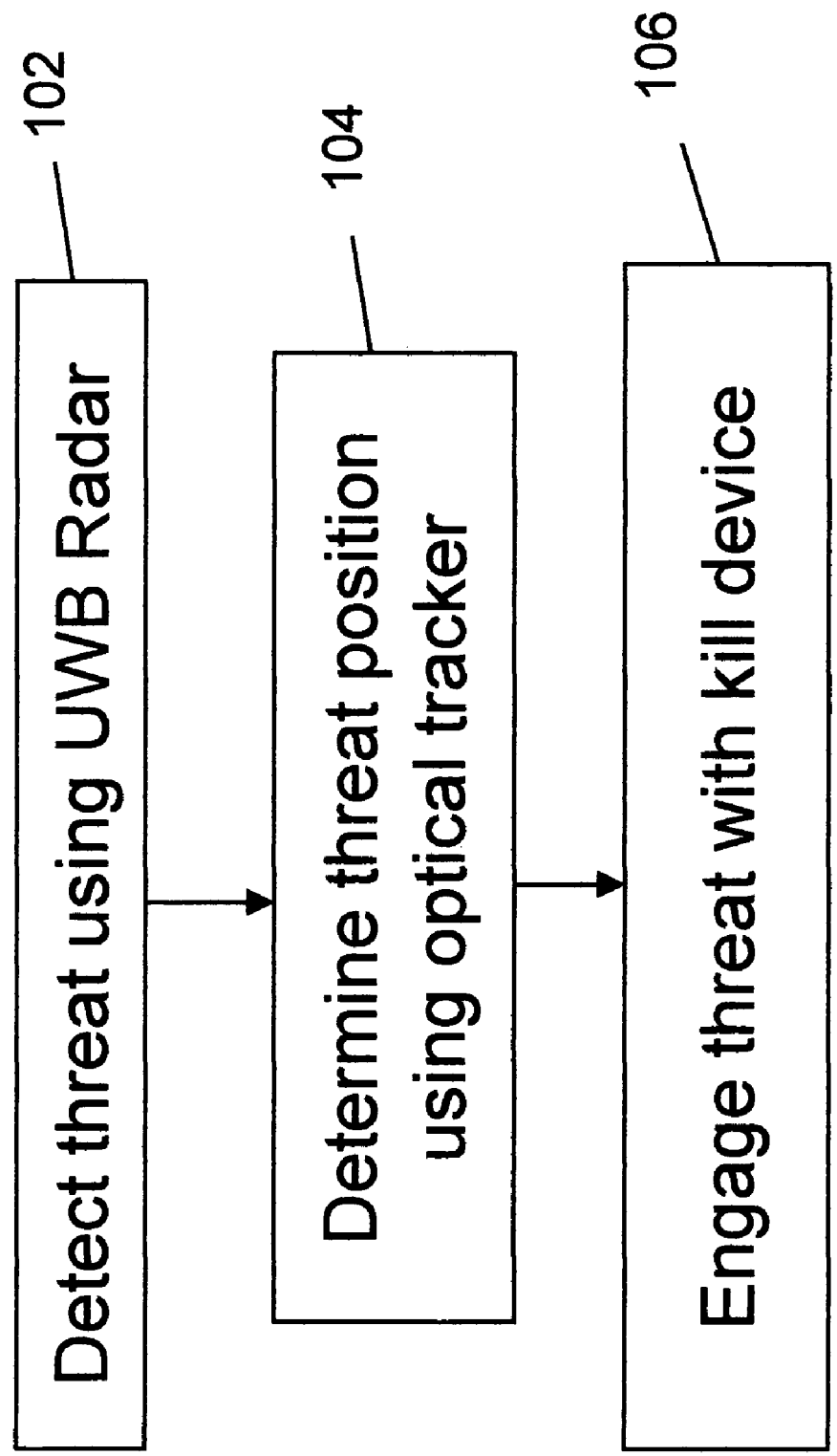
FIG. 1 is a block diagram of a method in accordance with the present invention.

FIG. 1 is a diagram of the steps of a method in accordance with the present invention. In step 102, a threat is detected using a UWB radar. UWB radar is uniquely adapted to detect objects and precisely measure range and angle to the object over the short ranges of engagement with threats such as RPGs. UWB with a center frequency on the order of 3 GHz can resolve range to on the order of 30 cm or better and, with a sparse array can resolve angle to on the order of one degree. Thus, UWB can provide a very precise initial fix and track on a threat for handoff to a more precise optical tracker. In step 104, an optical tracker acquires and tracks the threat initially detected and tracked by the UWB radar. The optical tracker can determine angle to on the order of 30 micro radians, sufficient to point a high power laser device and sufficient to aim a number of kinetic kill devices such as guided intercepting devices or ballistic shells or the like. In step 106, the threat is engaged with such kill device.

Figure 2:
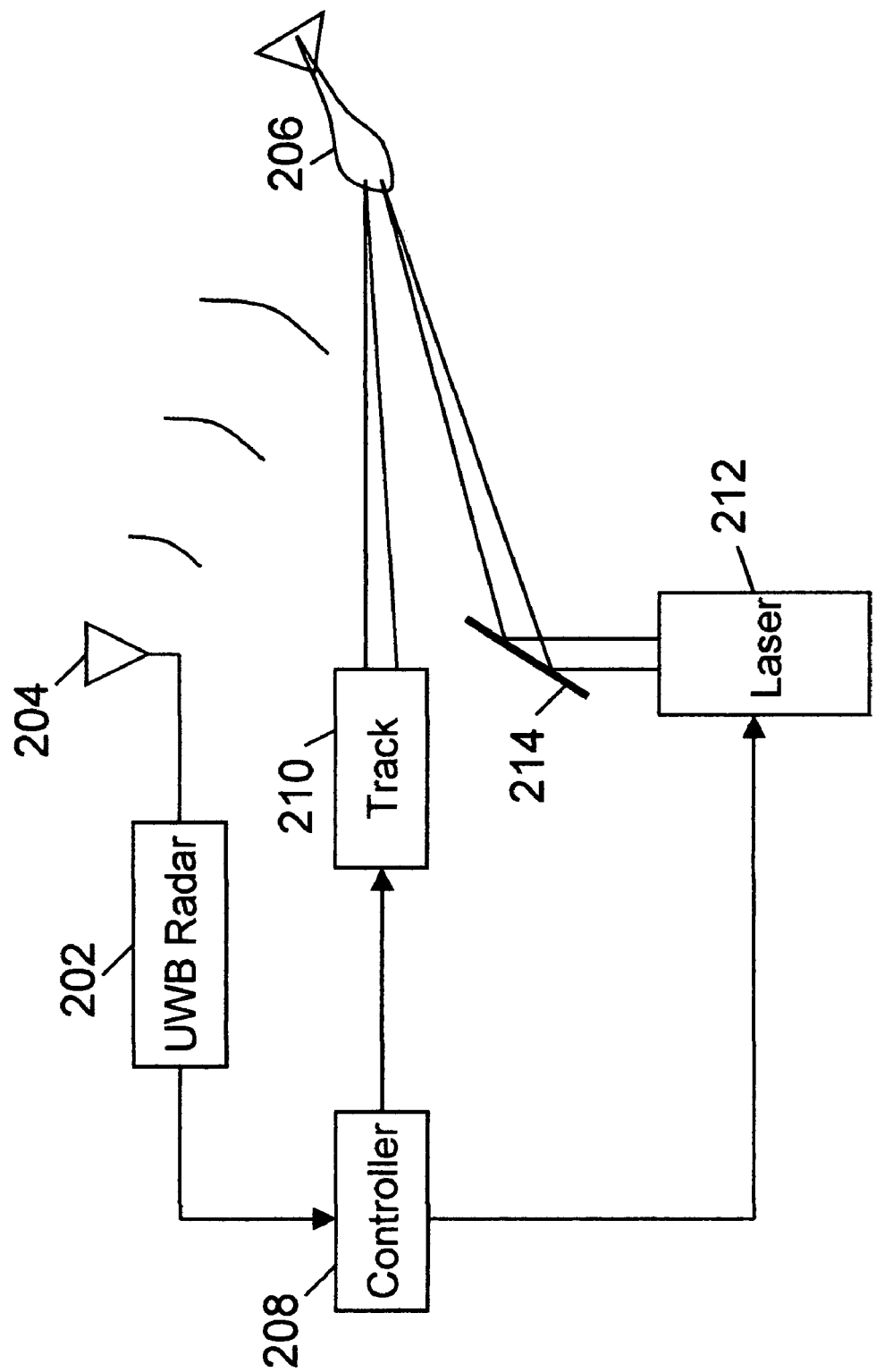
FIG. 2 is an exemplary block diagram of an active protection system in accordance with the present invention.

FIG. 2 is an exemplary block diagram of an active protection system in accordance with the present invention. Referring to FIG. 2, an ultra wideband radar 202, preferably utilizing a sparse array antenna 204, detects an incoming threat 206, such as an RPG 206. The threat's 206 position and possibly velocity information is then determined and relayed to a controller 208. The controller 208 controls subsystems, a tracking system 210 and a high power laser 212. The tracking system 210 begins searching in the detection volume indicated by the UWB radar 202. When the threat 206 is detected, the tracking system 210 then tracks the threat 206. As soon as track is established, the high power laser 212 is engaged and a laser pointing system 214 is directed toward the threat 206 according to the angular position indicated by the tracking system 210. Track then may continue using the high power laser 212 source. To assist tracking, the high power laser 212 source may be periodically dithered or scanned in angle to establish the correct track angle and then dwell on the target for maximum heating. Track is continued until track is lost and cannot be found again. Track may be lost if the threat 206 detonates or if the threat 206 is on a miss trajectory and generates too high angle rate to be tracked. Once the threat 206 is neutralized or passes, the trajectory information derived from the UWB radar 202 and optical tracker 210 may then be used to back track the trajectory to the source, potentially using the high power laser 212 against the source of the threat 206, i.e., the shooter of the RPG 206. Alternatively, the trajectory information may be sent to a command and control authority to coordinate return fire. The use of a high power laser 212 to return fire can potentially achieve return fire within tens of milliseconds of the firing of the RPG 206.

In an alternative embodiment, the system could employ two or more optical tracking systems 210 with two or more high power laser 212 devices, thus enabling multiple shots at a single incoming threat 206, the engagement of multiple incoming threats 206, and/or enabling the source of the threat 206 to be engaged simultaneously with the engagement of the threat 206.

In a further embodiment, multiple high power lasers 212 may be configured to cover separate zones about a resource, e.g. four high power lasers 212 may each cover separate 90 degree sectors around a vehicle 402, thus allowing full coverage in the presence of tall vertical structures and allowing greater flexibility in mounting the high power lasers 212. Where coverage zones may overlap, multiple high power lasers 212 may engage a single threat 206.

Figure 3:
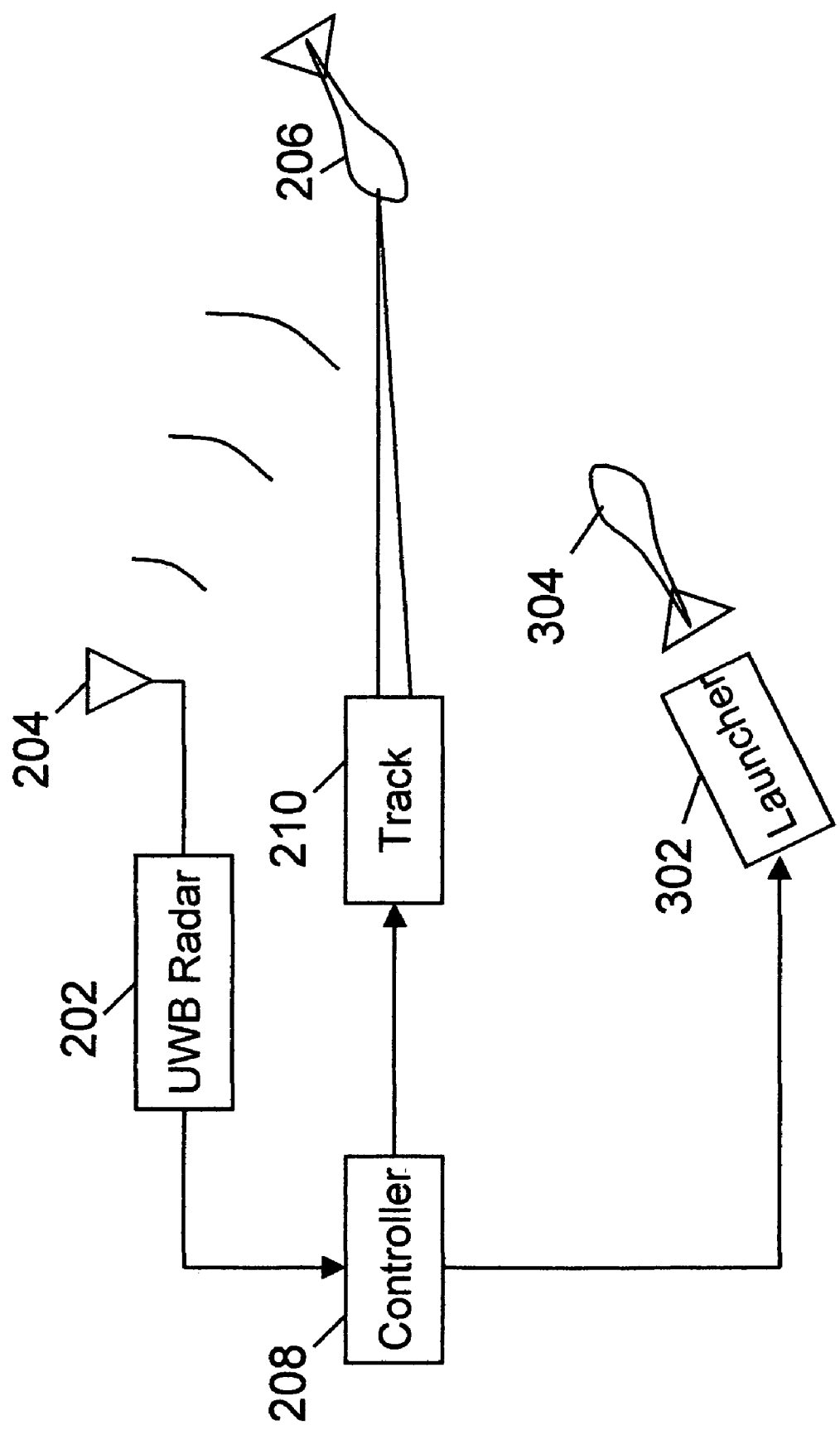
FIG. 3 is a system block diagram of an alternative active protection system in accordance with the present invention.

FIG. 3 is a system block diagram of an alternative active protection system in accordance with the present invention. Referring to FIG. 3, the kill mechanism may be a kinetic device 304. The kinetic device 304 may be either an intercepting device, i.e., a guided device, or a ballistic device, i.e., an unguided device.

Referring to FIG. 3, in the case of an intercepting device 304, the ultra wideband radar 202 initially detects the threat 206 and determines the approximate trajectory, including velocity and direction of arrival. The trajectory information is conveyed to an intercepting device 304 that may be initially pointed in the direction of arrival of the threat 206 and then the intercepting device 304 is launched. The intercepting device 304 contains a detector to lock on to an object in its field of view and control the interceptor to intercept the device. The UWB radar 202 can very accurately determine the threat 206 distance and direction enabling handoff to a simple on board homing device. Alternatively, the UWB radar 202 may track both the threat 206 and intercepting device 304 and provide guidance commands to the intercepting device 304 to intercept the threat 206. Such intercepting device 304 may have no need for an on-board homing device.

Alternatively the kinetic device 304 may be a ballistic device. The ultra wideband radar 202 initially detects the threat 206 and determines the approximate trajectory, including velocity and direction of arrival. The trajectory information is conveyed to a kinetic launcher 302, which may be a gun, rail gun or other such device. The kinetic launcher 302 includes an optical tracking system 210. The optical tracking system 210 then searches for the threat 206. Upon detecting the threat 206 by the optical tracking device, the kinetic launcher 302 launches a kinetic device 304 in the direction of the threat 206 in accordance with the precision direction information from the optical tracking system 210 and the range and trajectory information from the UWB radar 202.

In a further embodiment, a multiple layer defense system is employed comprising the high power laser 212 as a first engagement device followed by one or more kinetic devices 304. The specific mix of devices may be enabled by a user of the system to best match a given battlefield situation.

UWB is uniquely capable of determining range and angle to the threat 206. UWB can utilize information from a sparse array antenna 204 to resolve angle in accordance with the span of the antenna even in the absence of intermediate antenna elements. Angle may be determined by correlation matching the signal returns from the two antennas. If the UWB bandwidth is sufficient, the correlation match can be relatively unambiguous with respect to pulse envelope and signal phase, providing sub cycle resolution of time difference. A narrow band signal, in contrast, can only determine phase and cannot determine which of many cycles are present in the delay. For example, a 3 GHz sparse array of two elements 10 meters apart, the correlation match can theoretically achieve 1/10 wave resolution, or 1 milliradian angle resolution with only a front-back ambiguity that can be resolved with one other antenna. A narrow band system, however, can resolve the same 1/10 wave phase information, but will be uncertain as to which cycle is the right one. Since the distance of 10 meters is approximately 100 wavelengths at 3 GHz, the phase difference could include a span of 100 wavelengths in either direction for 200 wavelengths of uncertainty. These cycles of uncertainty correspond to angles that span 0 to 360 degrees in azimuth. Thus, the UWB sparse array can determine angle to a high precision unachievable with a comparable antenna using a narrow band system.

Figure 4:
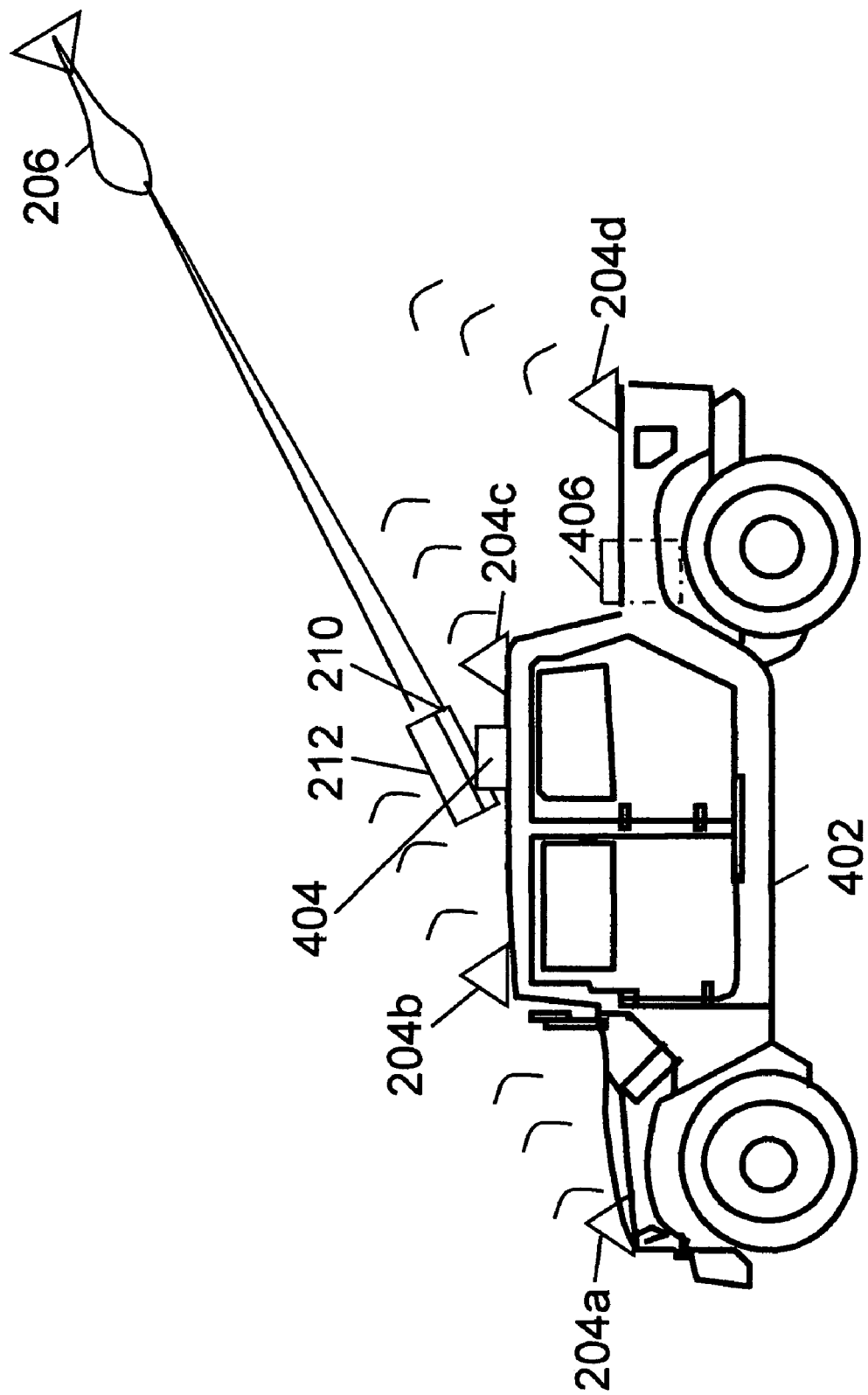
FIG. 4 shows an exemplary embodiment employing a turret mounted laser and tracking head.
Figure 5:
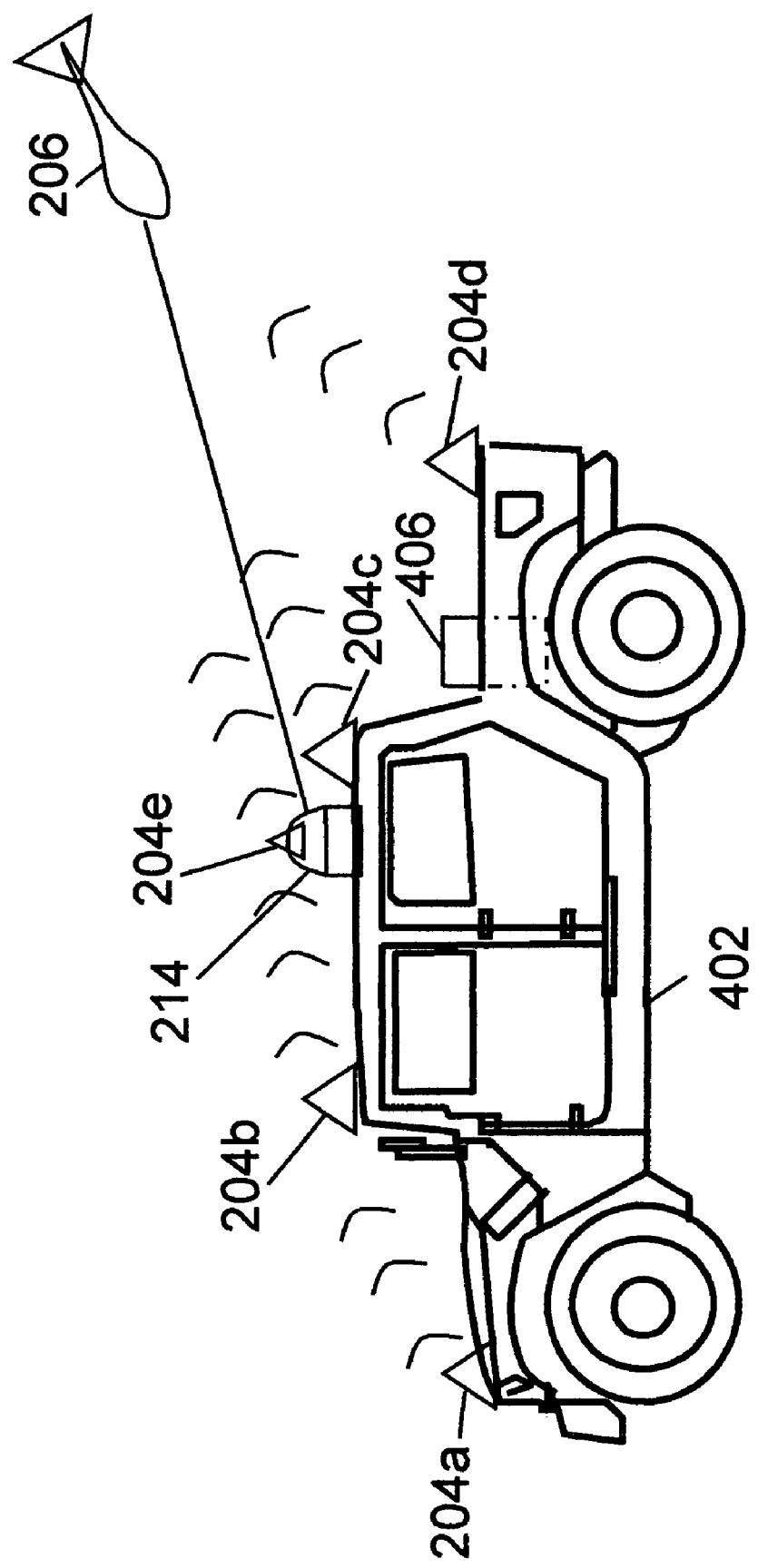
FIG. 5 shows an alternative embodiment employing a gimbaled mirror.
Figure 6:
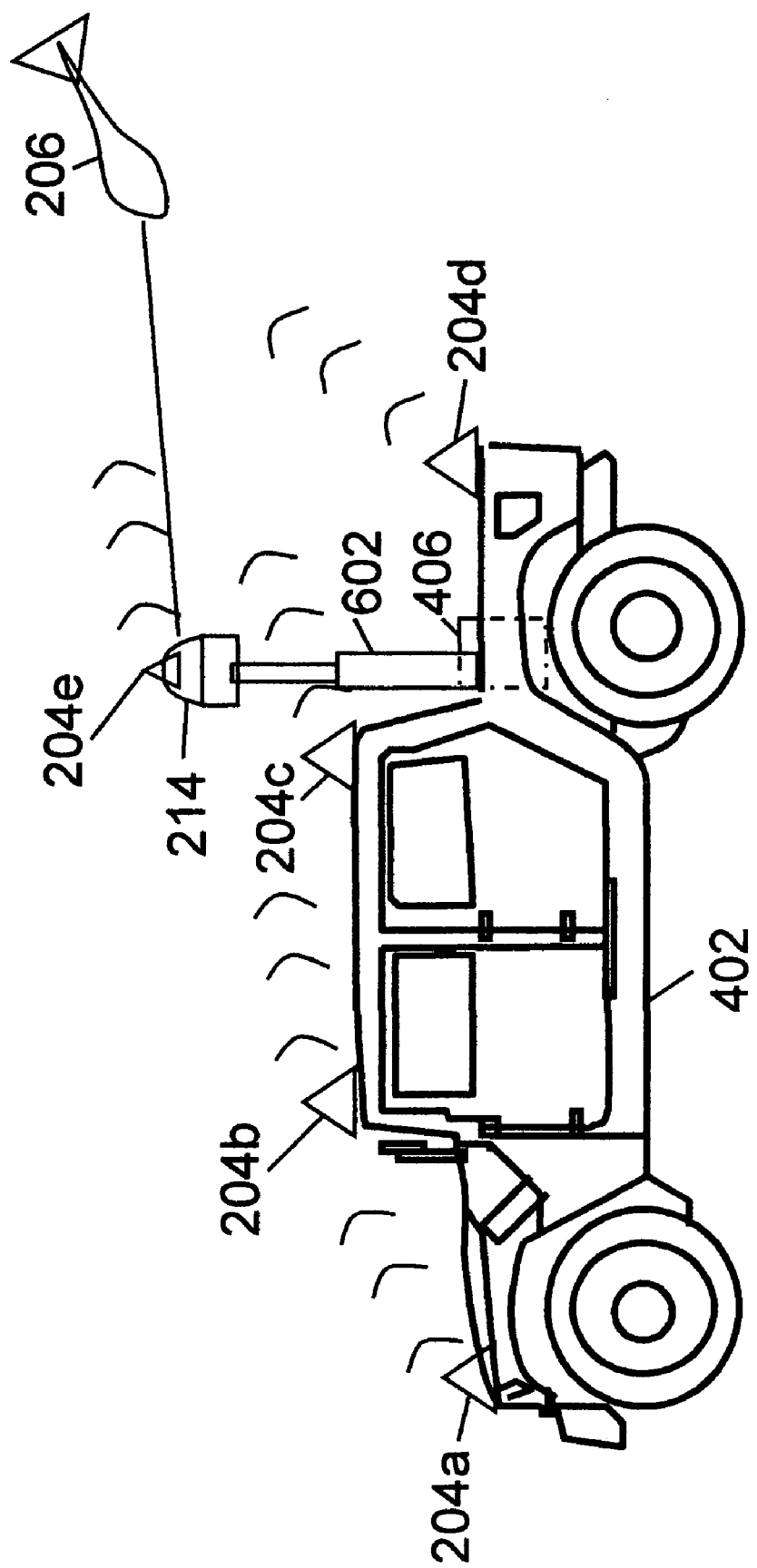
FIG. 6 shows an alternative embodiment of the system of FIG. 5 employing an extensible pedestal.

FIGS. 4–6 show several embodiments of the present invention deployed on a HMMWV type vehicle 402. The systems shown in FIGS. 4–6 comprise a UWB sparse array antenna 204 system, an optical tracker 210, a high power laser 212 and a laser power and control unit 408.

FIG. 4 shows an exemplary embodiment employing a turret mounted laser and tracking head. Referring to FIG. 4, the high power laser 212 and tracking head are mounted on a turret mount 404 rotatable in azimuth and elevation. The laser power and control unit 406 is mounted in available space in the vehicle 402. Also shown is a UWB sparse array. Each outside corner of the vehicle 402 has one antenna element. Each outside corner of the roof has one antenna element for a total of eight antenna elements 204a–204d (four shown). The sparse array thus utilizes maximum horizontal and vertical span available from the vehicle 402 to yield maximum angle resolution in both azimuth and elevation. In the system of FIG. 4, the UWB system is used to detect the threat 206 and find an initial position. The optical tracker 210 is used to determine a fine position. The laser is then directed to the angle determined from the optical tracker 210 and the laser is focused according to the UWB range information.

FIG. 5 shows an alternative embodiment employing a gimbaled mirror 214. Referring to FIG. 5 the high power laser 212 and optical tracker 210 are steered by a gimbaled mirror 214 providing azimuth and elevation steering for both the optical tracker 210 and high power laser 212 system. Further, there is an additional sparse array antenna 204e element on top of the gimbaled mirror 214 housing to provide additional height for the sparse array for additional vertical angle resolution.

FIG. 6 shows an alternative embodiment wherein the gimbaled mirror 214 housing is mounted op an extensible pedestal 602. The pedestal 602 may be lowered for minimum profile in brush or forest and raised to keep the high power laser 212 beam clear of people or objects nearby. The raised configuration also potentially provides greater vertical resolution for the UWB sparse array.

Figure 7:
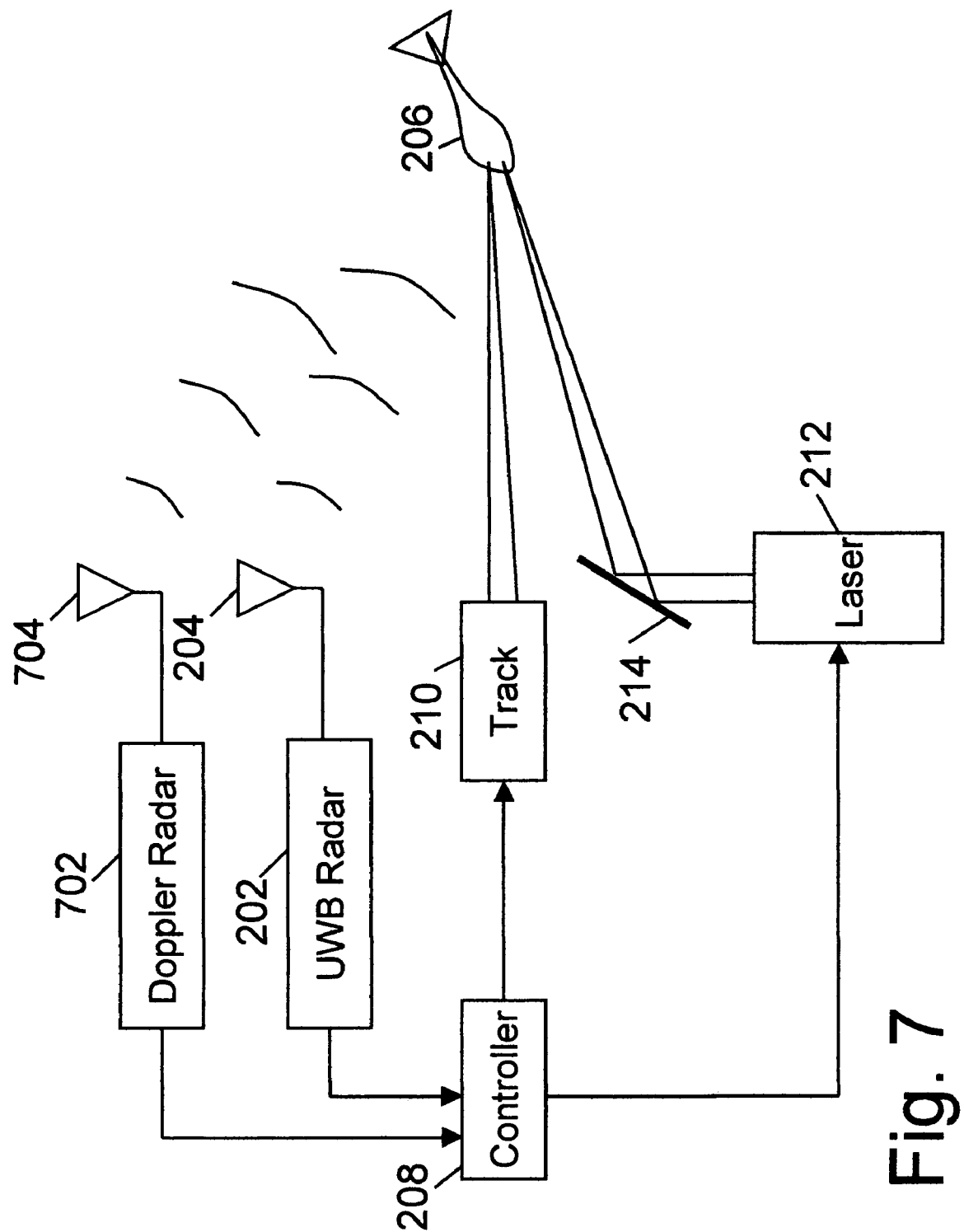
FIG. 7 illustrates an alternative embodiment of the present invention employing Doppler radar.

FIG. 7 illustrates an alternative embodiment of the present invention employing Doppler radar 702. Referring to FIG. 7, the Doppler radar 702 is used to sense the presence of an object in the velocity range of a potential threat 206. When such object is detected, the UWB radar 202 is used to determine angle and range. Then, the optical tracking system 210 finds fine angle and the high power laser 212 is directed along the angle found by the optical tracking system 210 and focused according to UWB radar 202 range.

The Doppler radar 702 may be omni directional or may be directional for added gain and may scan an area. Also the Doppler radar 702 may utilize multiple antennas in a direction finding array 704 (for example three or four) and compare received phase information among the antennas to determine a rough azimuth angle. In addition, the Doppler radar 702 may be pulsed to determine a rough range value.

In one embodiment, the Doppler radar 702 is used continuously for initial detection. The UWB radar is turned on only when a threat 206 is detected. Such operation permits the Doppler radar 702 to operate with significant RF power in a narrow allocated band and allows the UWB radar to utilize more power than it otherwise might be allowed if it were to operate continuously because of system compatibility and spectrum allocation issues.

Figure 8:
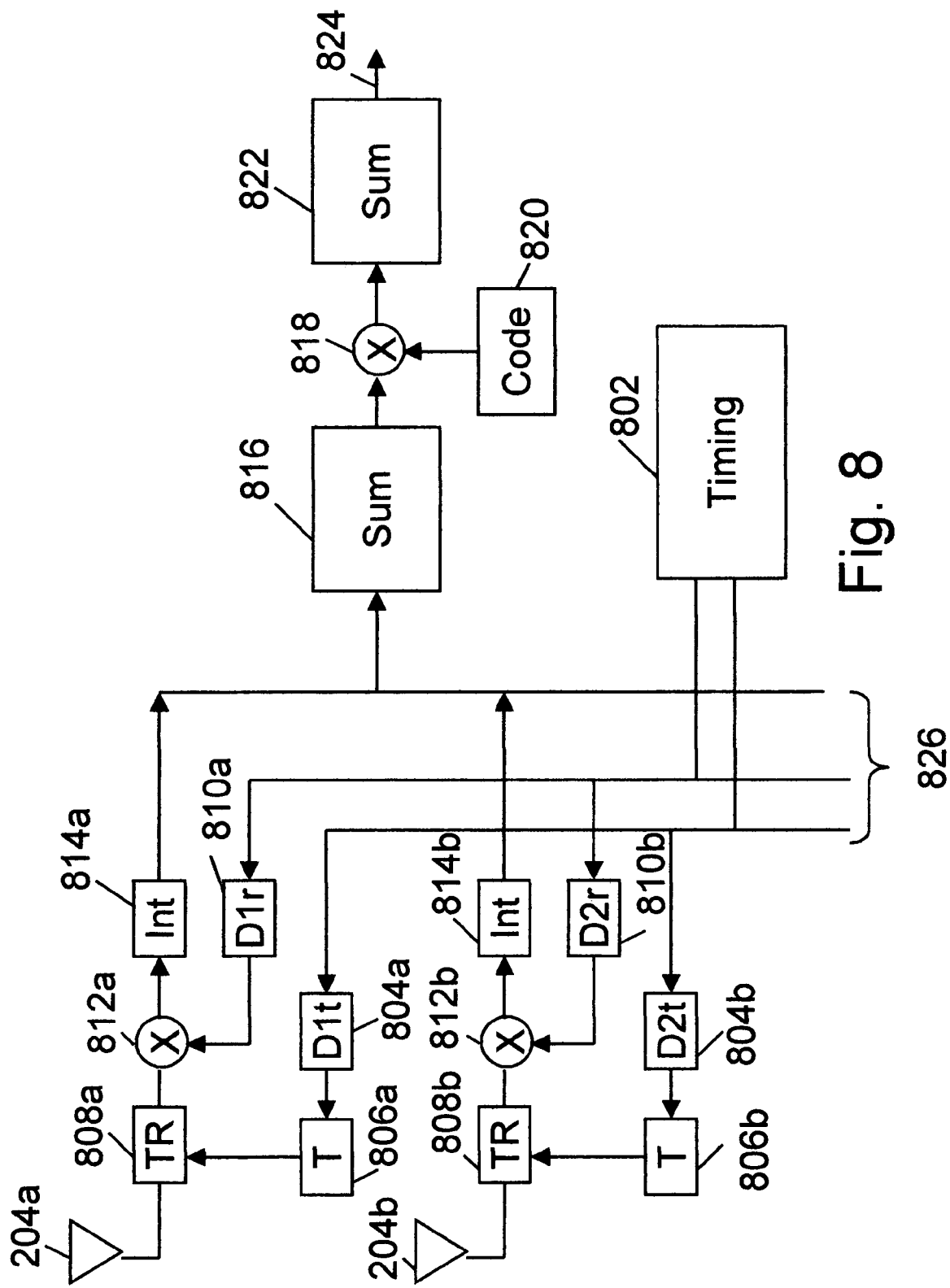
FIG. 8 is a detailed block diagram of a sparse array front end for the UWB radar of FIG. 2.

FIG. 8 is a detailed block diagram of a sparse array front end for the UWB radar of FIG. 2. The sparse array system shown in FIG. 8 is utilized for transmit and receive. Alternatively, the transmit or receive function may utilize an omni antenna or may utilize a different sparse array. Referring to FIG. 8, a transmit pulse is initiated by the timing system 802. The transmit pulse is delayed 804a, 804b according to the beam forming commanded by a scanning system (not shown). A delayed pulse is generated 806a, 806b and passed through a Transmit/Receive unit 808a, 808b to the antenna elements 204a, 204b. Each antenna element 204a, 204b receives a pulse separately delayed in accordance with the beam forming command. Thus the transmit pulses are generated such as to arrive simultaneously along a given direction at a given range.

In a like manner, a received sampling pulse is initiated by the timing system 802 and delayed 810a, 810b in accordance with a beam forming command. The delayed pulse samples or correlates 812a, 812b with the received signal and is integrated 814a, 814b (filtered) and summed 816 with other samples, each resulting from separately delayed sampling pulses, to yield a composite sample in accordance with the beam forming command.

The composite sample is then processed 818 to remove any spectrum spreading code 820 applied to the original transmit signal. The result is then summed 822 with other samples from the same range and angle to form a sum signal 824 representing the response from the commanded direction and range.

Two array elements 204a, 204b are shown; however the signal and control lines 826 may be extended to N elements as necessary for a particular application.

Figure 9:
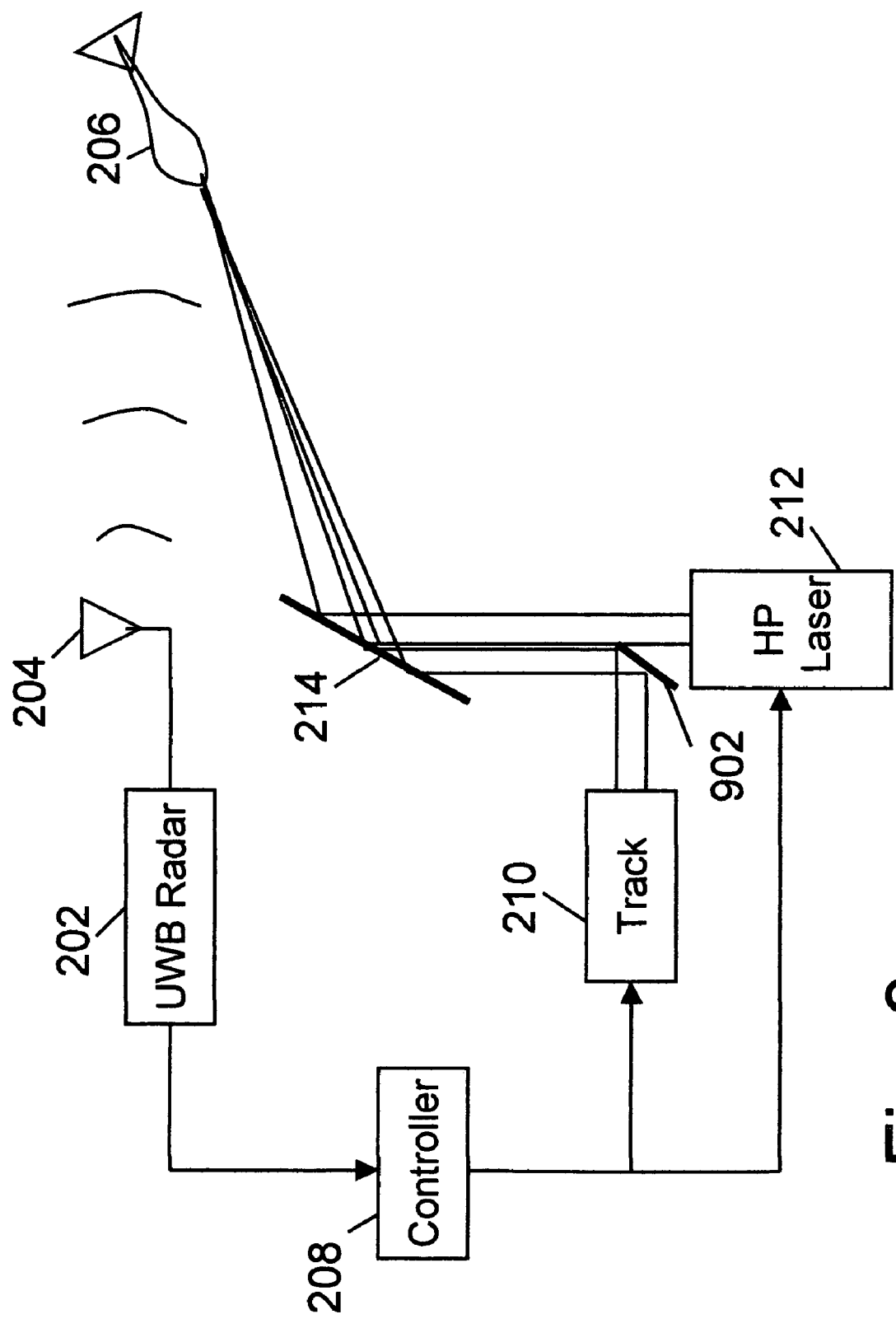
FIG. 9 illustrates one embodiment of the system of FIG. 2 with a common gimbaled mirror for the optical tracker and high power laser.

FIG. 9 illustrates one embodiment of the system of FIG. 2 with a common gimbaled mirror 214 for the optical tracker 210 and high power laser 212. Referring to FIG. 9, the optical tracker 210 and high power laser 212 are fix mounted relative to the frame of the vehicle 402. The optical tracker 210 and high power laser 212 share a portion of the aperture of a gimbaled mirror 214. A mirror 902 is used to add the optical tracker beam to the aperture of the gimbaled mirror 214.

FIG. 10 depicts one embodiment of a gimbaled mirror 214 in accordance with the present invention. Physical details of the gimbal are not shown for clarity of operation. More physical details are shown in FIG. 11. The gimbaled mirror 214 is shown relative to an azimuth bearing 1002, azimuth axis 1004, and elevation axis 1006. A laser beam 1008 is shown propagating through the assembly. Thus, the gimbaled mirror 214 can rotate 360 degrees around a vertical axis providing 360 degrees of azimuth coverage. The elevation axis 1006 of the assembly easily provides zero (horizontal) to 45 degrees elevation coverage or more. Because the main weight of the high power laser 212 may be mounted to the frame and only the gimbaled mirror 214 is required to move to track the object, very fast response may be achieved in a small package. The gimbaled mirror 214 may be preferably made from a light weight thermally stable material such as beryllium or aluminum alloys coated with high reflectance material at the wavelength of the high power laser 212.

Figure 11B:
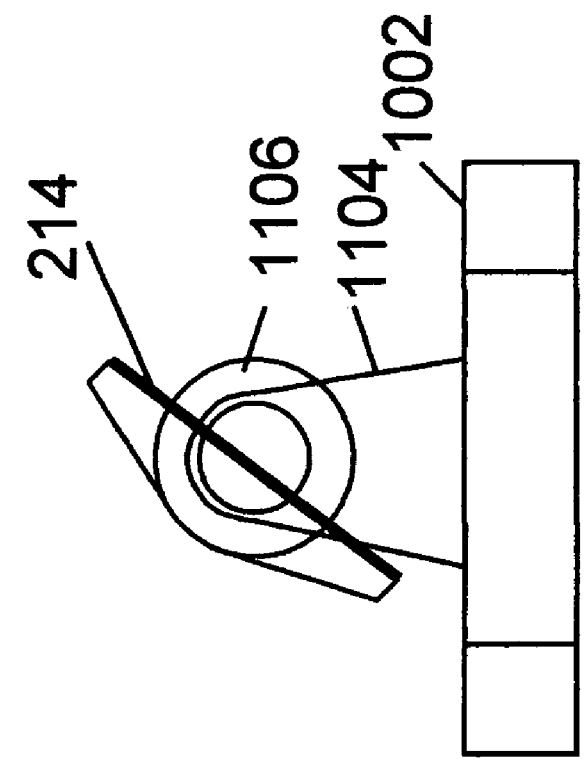
FIGS. 11A and 11B show more detailed views of the mirror of FIG. 10.
Figure 11A:
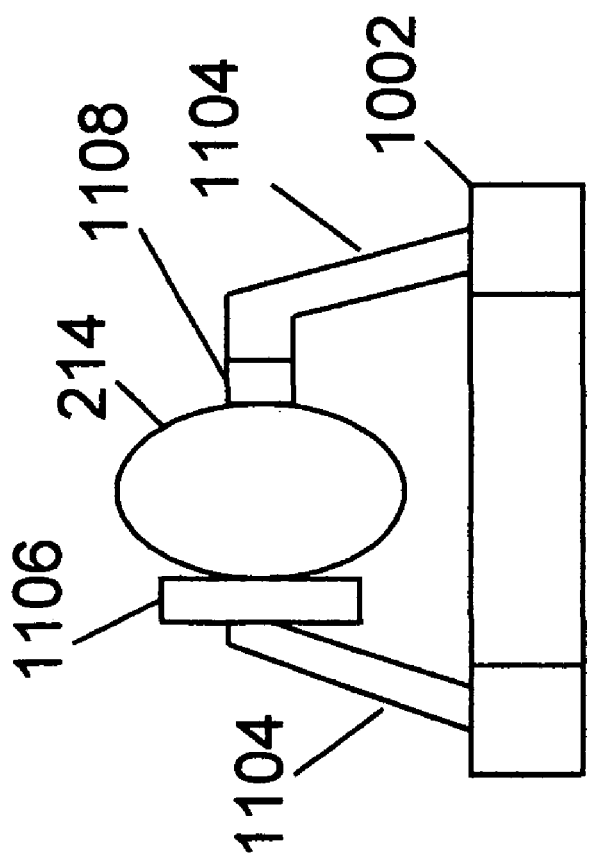

FIGS. 11A and 11B show the gimbaled mirror 214 of FIG. 10 in greater detail. Referring to FIG. 11A, the gimbal azimuth bearing 1002 is a ring bearing with inner diameter large enough to pass the laser beam 1008. The elevation axis 1006 is offset on a pair of arms 1104 to allow the beam to be reflected 90 degrees, enabling a horizontal beam, or even slightly downward beam, as necessary. The elevation axis 1006 includes a torque motor 1106, angle sensor (included with torque motor 1106) and bearings 1108. High vertical elevation angles require a very long gimbaled mirror 214 length. FIG. 11b shows a side view of the gimbal assembly of FIG. 11A.

FIGS. 12A and 12B show an alternative embodiment of the gimbaled mirror 214 of FIG. 2 which can scan in azimuth over the range from horizontal to vertical. Referring to FIG. 12A, a first mirror 1202 is fix mounted to the rotating portion of the gimbal azimuth bearing 1002. The first mirror 1202 has a fixed angle of 22½ degrees resulting in an intermediate beam angle of 45 degrees from vertical. A second mirror, an offset gimbaled mirror 214 is rotateable along an offset elevation axis 1006 perpendicular to the azimuth axis 1004, but not passing through the azimuth axis 1004, allowing coverage of elevation. As shown in FIG. 12A the offset gimbaled mirror 214 is positioned at a 22½ degree angle counterclockwise from vertical producing an output laser beam 1008 directly vertical.

FIG. 12B shows the embodiment of FIG. 12A with the offset gimbaled mirror 214 at a 22½ degree angle clockwise from vertical resulting in a horizontal output laser beam 1008. Thus the system of FIGS. 12A and 12B can easily scan from horizontal to vertical or slightly more with slight adjustment of axis positions. When a gimbaled mirror 214 arrangement is discussed in this disclosure, it is intended to include generally any useful two axis structure.

Figure 13:
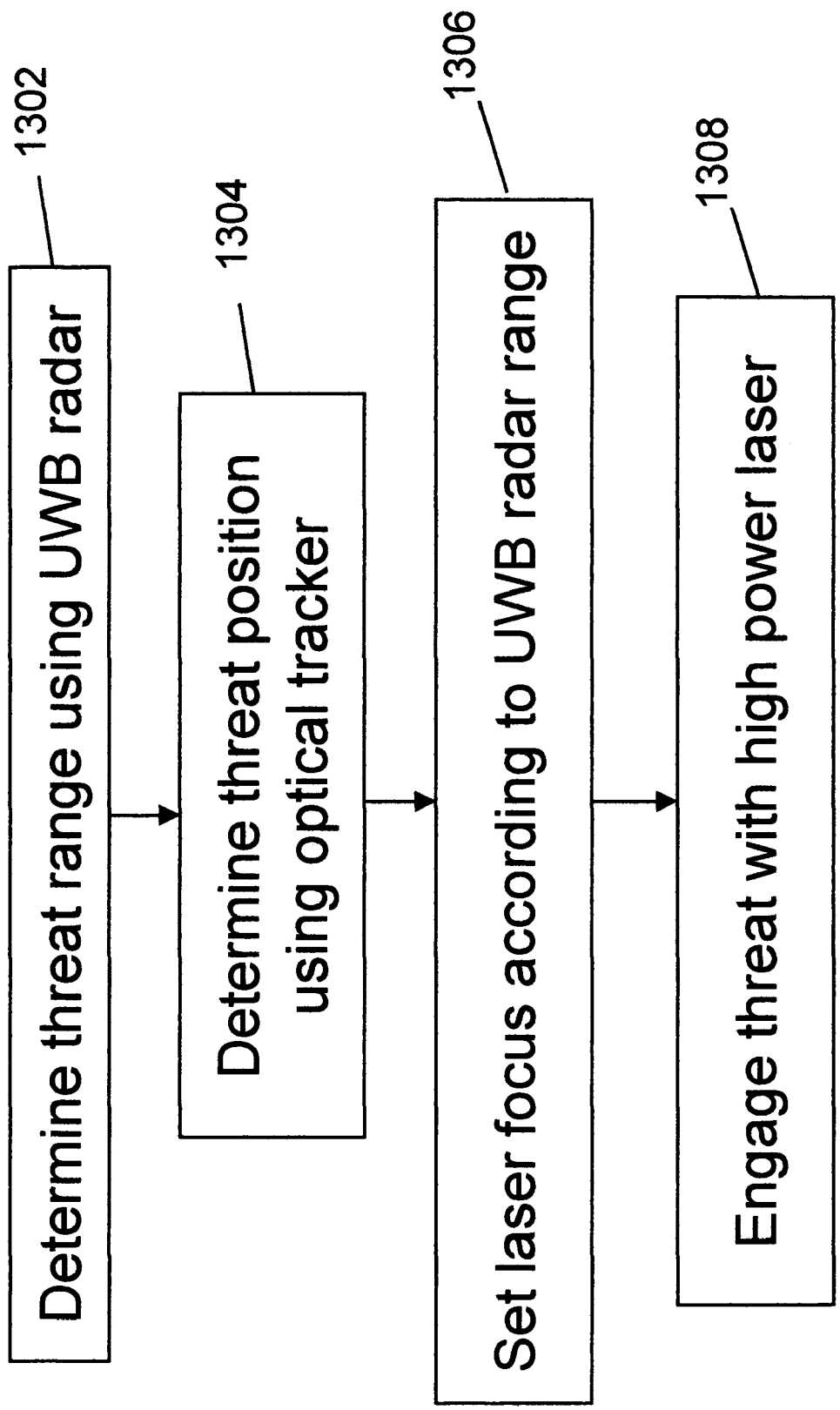
FIG. 13 illustrates the steps of a method for engaging a threat in accordance with the present invention.

FIG. 13 illustrates the steps of a method for engaging a threat 206 in accordance with the present invention. Referring to FIG. 13, in step 1302 the threat 206 range is determined using UWB radar. UWB radar 202 in a band above 1 GHz is capable of resolving range to a fraction of a meter. In addition, using a sparse array, UWB radar 202 can resolve angle to a small region to allow quick acquisition of an optical tracker 210. In step 1304, threat 206 angular position is determined using an optical tracker 210. The optical tracker 210 can determine threat 206 position to tens of microradians, sufficient for pointing a high power laser 212. In step 1306, the laser is pointed according to the optical tracker 210 angle information and focused according to the UWB radar range information. In step 1308, the threat 206 is engaged with the high power laser 212 according to angle information from the optical tracker 210 and range information from the UWB radar.

Alternatively, the optical tracker 210 may include a laser range finder and high power laser 212 focus information may be derived from the laser range finder.

Figure 14:
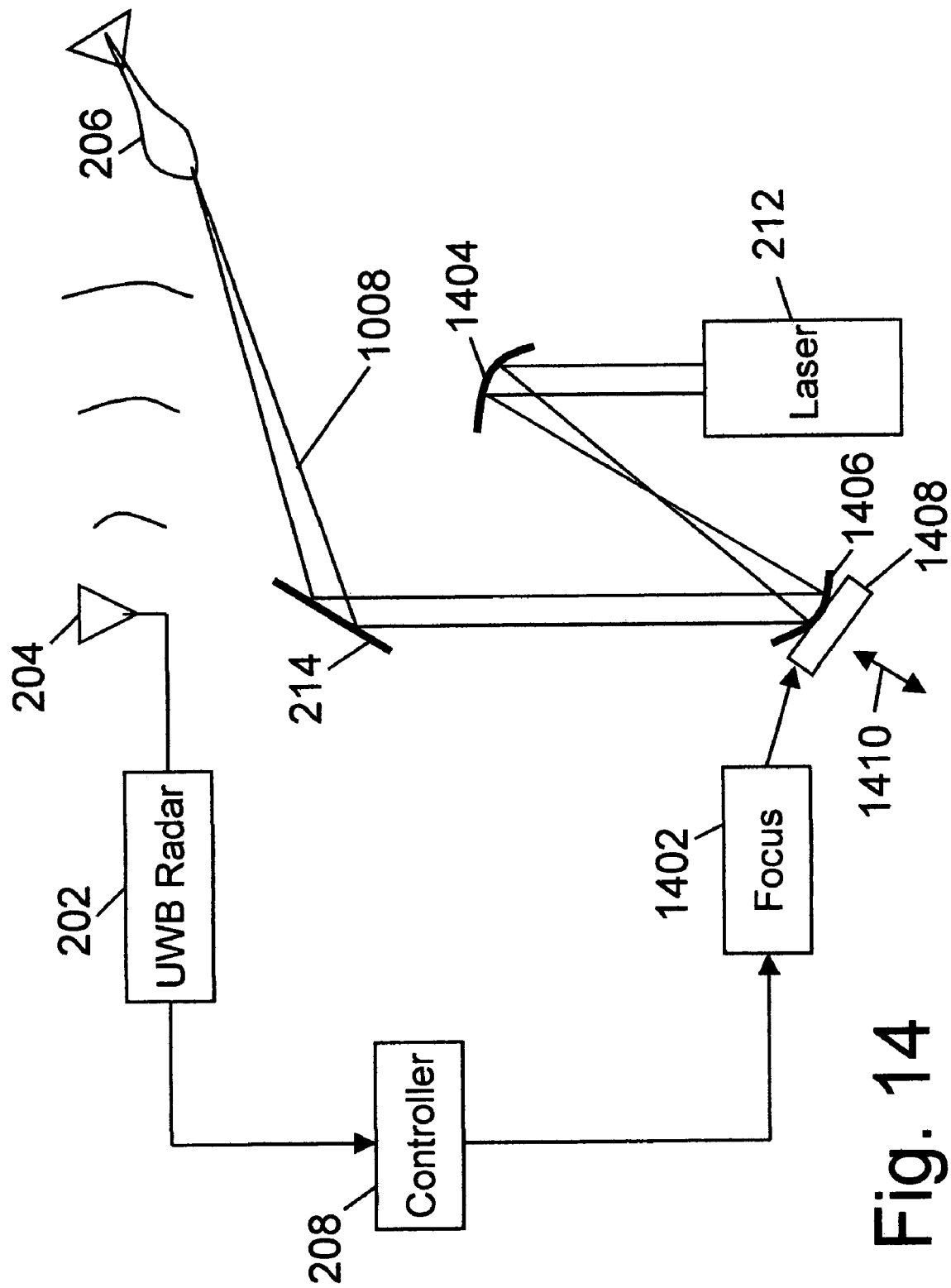
FIG. 14 illustrates a system in accordance with the present invention.

FIG. 14 illustrates a system in accordance with the present invention. Referring to FIG. 14, UWB radar 202 range information is used by the controller 208 to set the focus the high power laser 212 to focus the laser at the threat 206 distance. The optical train includes a focusing mirror 1404 and a collimating mirror 1406. The collimating mirror 1406 is adjusted by a focus controller 1402 using a focusing servo 1408 along the optical axis 1410 of the intermediate beam to vary the focus of the laser beam 1008.

Figure 15:
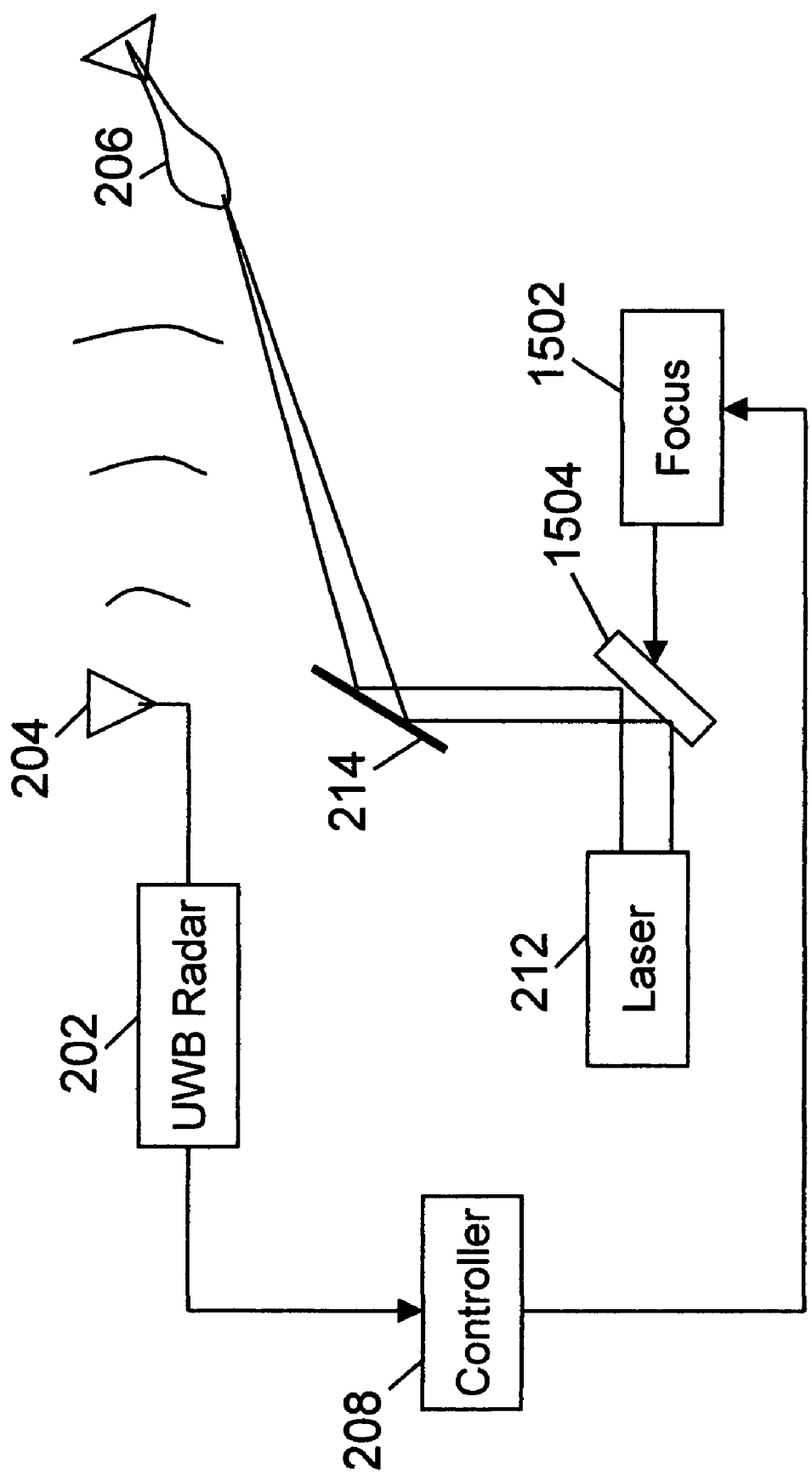
FIG. 15 illustrates an alternative system for focusing the laser of FIG. 13.

FIG. 15 illustrates an alternative system for focusing the high power laser 212 in accordance with the present invention. Referring to FIG. 15, the UWB radar provides range information to the controller 208. The controller 208 supplies control information to a focusing system 1502 that bends a flexible mirror 1504 to provide the appropriate focal length change.

Figure 16:
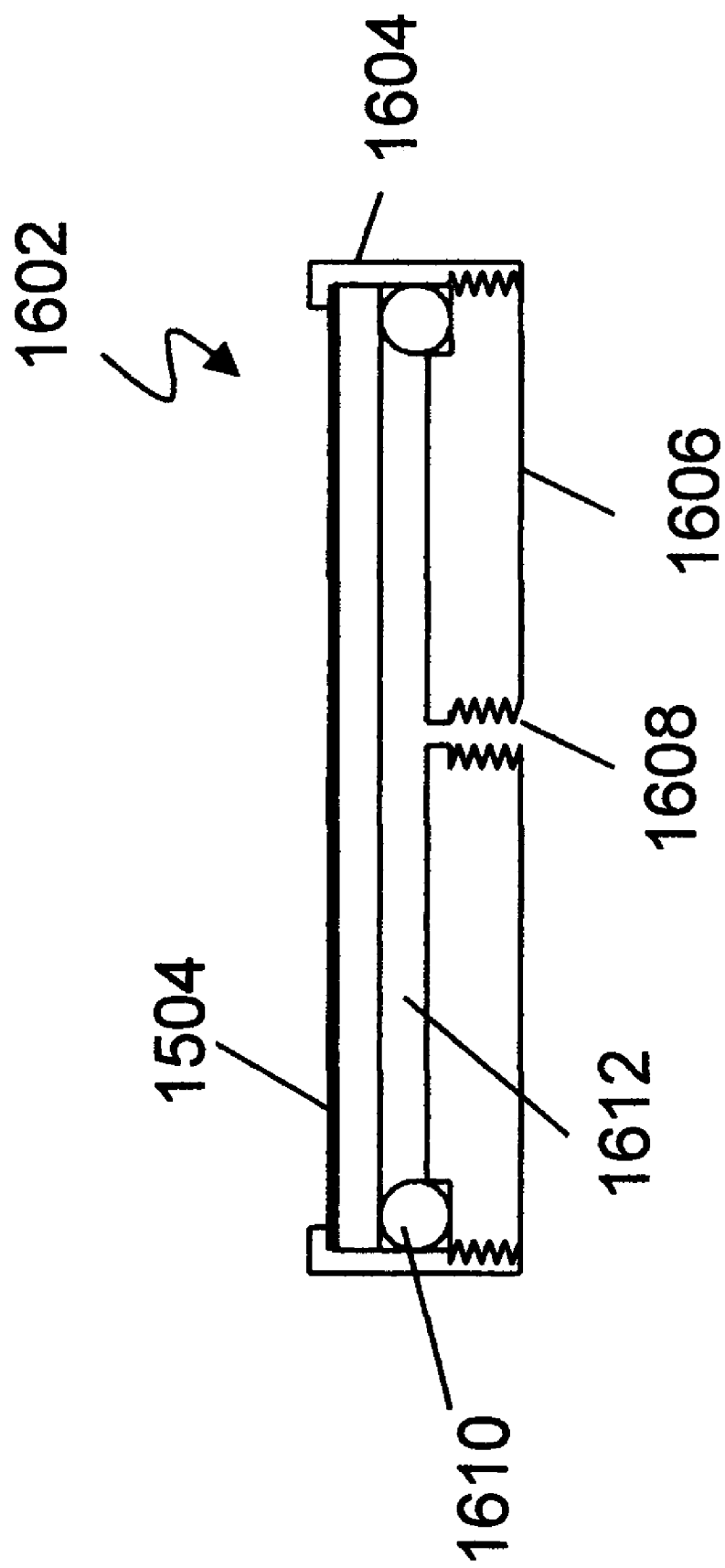
FIG. 16 illustrates a flexible mirror focusing apparatus as used in FIG. 15.

FIG. 16 illustrates a flexible mirror 1504 focusing apparatus 1602 as used in FIG. 15. Referring to FIG. 16, a preferably round, flexible mirror 1504 is installed in a holder comprising a ring 1604 and a back plate 1606. The back plate 1606 includes a port 1608 for applying a fluid to a cavity 1612 behind the mirror. The cavity 1612 is sealed with an O-ring 1604. The fluid may be a gas or may be a liquid. Fluid pressure acts to bend the flexible mirror 1504 creating a curved surface. The thickness of the flexible mirror 1504 may be varied to optimize the curve for precise focus. Since only a very slight deviation is needed to adjust the focus over a typical operating range of from 30 meters to 300 meters, the mirror materials may include optical glass and metals.

Figure 17:
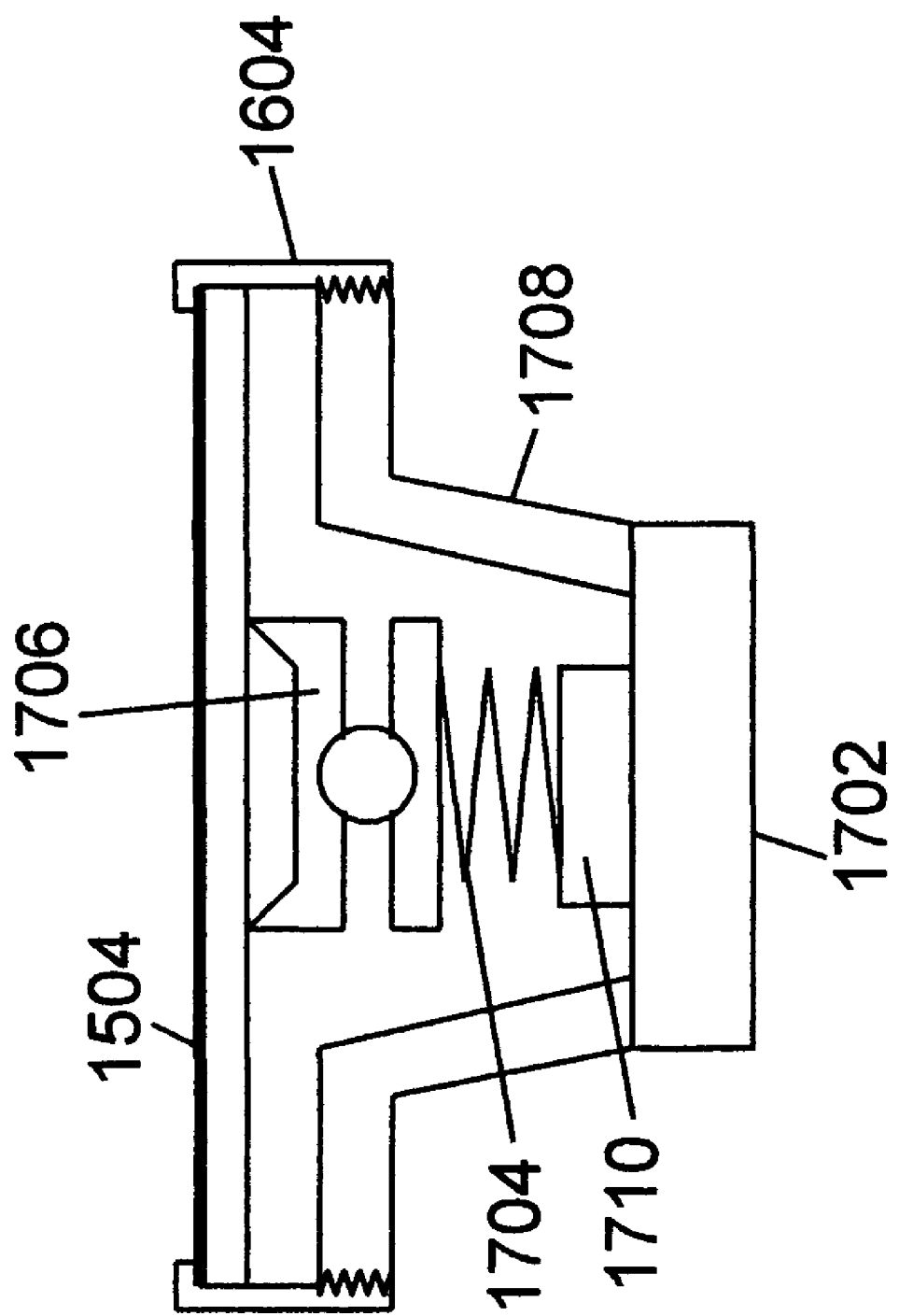
FIG. 17 illustrates an alternative flexible mirror focusing apparatus as used in FIG. 15.

FIG. 17 illustrates an alternative flexible mirror 1504 focusing apparatus as used in FIG. 15. Referring to FIG. 17, the flexible mirror 1504 is flexed by applying a force through a spring 1704 using a servo mechanism 1702. The servo mechanism 1702 displaces an output piston 1710 which compresses a spring 1704 coupling the resulting force through a pressure disk 1706 to a circle on the back of the flexible mirror 1504. Again, the flexible mirror 1504 may be profiled in thickness to refine the curve produced by the force. Alternatively, a force transducer may be used in place of the servo mechanism 1702 and spring 1704.

Sparse Array Antenna

A UWB system may benefit in multiple ways from a sparse array antenna. The sparse array may be configured to yield gain or may deliver angle resolution.

Gain is achieved by adding signal from multiple antennas in accordance with a time delay from each signal that would sum if the signal originated from a desired point in space, the focus.

A sparse array configured to give gain will typically have substantial sidelobe response. A potential threat response signal received on a sidelobe response may result in pointing the optical tracker in the wrong direction and finding nothing, or responding with the high power laser where there is nothing and missing the threat. The sidelobe response can be mitigated by sidelobe differentiation and by scanning for a maximum. Sidelobe differentiation may be performed by determining whether all or most of the antenna elements are contributing to the sum by eliminating antenna elements or groups of antenna elements to see if the signal drops accordingly. If only a portion of the antenna elements are contributing to the sum a sidelobe response is to be suspected. The effect of noise must be considered in the sidelobe differentiation process because noise can cancel or bury the signal from a single antenna and result in an incorrect conclusion if noise is not considered. Thus, sufficient integration gain should be included with each measurement to overcome noise.

Alternatively, and in addition, the potential for mistaken use of a sidelobe response may be mitigated by scanning the antenna array through all angles when a response is detected to see if a higher response can be found. If a higher response can be found, the highest response is the main lobe and others are sidelobes.

Angle resolution may be achieved by forming a gain antenna array and resolving the angular implications of the resulting response. Alternatively, angle resolution may be achieved by correlation analysis performed on the scans from each antenna element taken individually.

The gain antenna array may be formed by adding antenna element response signals with delays associated with a given direction. The direction may be deviated to each side to determine the maximum response. A maximum response angle may also be determined by noting the angle associated with a reduced response, such as for example a 6 dB reduced response on each side of the peak. The angle of the peak may then be determined as half of the way between the two reduced responses on either side of the peak.

Alternatively, a sliding correlation analysis may be performed on range scan information from the antennas in an array. The time difference results from an object return signal may then be used to determine direction.

Multiple Correlators

The performance of a UWB radar can benefit from multiple correlators. The multiple correlators may be applied in several ways. The multiple correlators may be applied to process antenna element signals in parallel, or may be applied to process multiple received samples for each transmitted pulse or both.

Multiple correlators may be applied to multiple antenna elements in real time. In one embodiment, one correlator is applied to each antenna element wherein the sampling signals are delayed to yield a directive response as in FIG. 8. The sampled signals are then added and processed as a single response from a directive antenna. The use of parallel elements in this way speeds processing over a single correlator system that samples each antenna individually in turn and then sums the results. Further the parallel correlators achieve a combined response from a single transmitted pulse; whereas, the single correlator may require multiple transmitted pulses, one for each sample.

Alternatively, multiple sets of multiple correlators may be used to generate a response from multiple angles simultaneously using the same transmitted energy. For example one set of correlators as shown in FIG. 8 may be used for zero degrees azimuth, another parallel set may be configured with delays set for response to one degree azimuth and so on for 360 degrees. The results for 360 degrees in one degree increments could be achieved in parallel for the same transmit power as a single response as in FIG. 8.

In another embodiment, range scans may be produced for each antenna and the scan data combined in post processing. For example, ten antenna array elements may each be scanned, generating 1000 samples from each antenna, each sample being the response from a different transmit pulse. A postprocessor may then combine the ten scans in accordance with the respective time delays associated with each degree of rotation for 360 degrees.

Multiple correlators may sample a radar return at multiple (range) time delays, thus generating a full range time scan in a fraction of the time of a single correlator. For example, a range scan may comprise 1000 samples representing the response over a range span from 20 to 500 meters. A system may use 100 correlators each sampling in turn 10 of the 1000 samples. Thus, for one transmit pulse, 100 samples are produced and the full scan of 1000 samples is accomplished in the time of 10 transmitted pulses.

Further, a compound multiple correlator system using post processing may have multiple correlators for each multiple antenna element. For example, each of the ten antenna elements may have one hundred correlators, each of which is used to sample ten of the 1000 samples. Thus, for each transmit pulse 100 samples are generated, and the 1000 samples are generated using ten transmit pulses. After ten pulses the information is available for the postprocessor to combine the scans for each degree of 360 degrees.

Thus, multiple correlators may greatly improve the speed of processing and reduce the transmitted power required by the UWB radar to detect and track the threat.

Threat Criteria

The UWB radar may utilize multiple criteria to determine whether an object is a potential threat. These criteria include but are not limited to velocity, trajectory, acceleration/deceleration, radar signature, and radar cross section.

RPGs typically achieve a velocity just slightly subsonic. Such velocities are rarely achieved by benign objects, thus velocity may be one of the primary criteria for determining threat potential. Other criteria include a trajectory that is approaching and one that has the right shape. Radar return signal strength and the shape of the response may provide further information to determine the nature of the object. Signal strength combined with UWB radar distance can determine a radar cross section which can be correlated with the threat type.

High Power Laser

In one embodiment, a high power laser is directed to focus a spot on the threat object to damage the threat object to reduce or eliminate the threat effectiveness. Several damage mechanisms may be employed:

Laser Damage Mechanisms:
 1. Detonation of threat round
 2. Destruction of threat round initiator
 3. Unbalancing or misshaping of shaped charge
 4. Reduction of explosive strength or shrapnel distribution Laser energy is used to melt or burn through the threat case, destroying the integrity of the case and possibly destroying the effectiveness of the threat by premature detonation of the round, destruction of the round initiator resulting in a dud round, unbalancing the shaped charge, diffusing the focus and reducing the penetration capability, or reducing the explosive strength or shrapnel distribution by disruption of case integrity and partial destruction of explosive.

In one embodiment, the laser energy required to effect such damage is approximated by calculating the heat required to melt a path two centimeters deep in steel. To melt a hole 1 $cm^2$ by 2 cm deep in steel requires melting 16 grams of steel. Steel has a specific heat of about 0.1 calorie per gram. Thus, 16 grams require 1.6 calories per degree C. To heat to the melting point of steel, 1500 degrees C., thus requires 2400 calories. Converting to Joules at 4.2 joules per calorie is 10,100 joules. With a 10% absorption (90 percent reflection) the required energy is 101,000 joules. To heat in one second requires 100 kW of laser power for 1 second.

The energy required to effect a desired probability of kill will vary with the specific threat model. Field and laboratory tests and computer modeling may be used to optimize the requirement and trade the deployment size of the laser system with potential effectiveness. Thus, a system may be constructed using more than or less than 100 kW, as needed.

It is clear that a laser of the class used in industrial laser cutting is needed to fulfill this need. Several such lasers are as follows by way of example and not limitation:

Laser Types:
1. Nd:YAG
   a. Diode pumped
2. $CO_2$
3. Chemical Oxygen-Iodine

The Nd:YAG laser is a solid state laser which may be pumped by a number of types of sources including lamps and diodes. In one embodiment a Nd:YAG laser is pumped by an array of diodes using parabolic concentrators. The $CO_2$ laser is another high power continuous wave laser that may be used. The Chemical Oxygen-Iodine laser offers high power, near diffraction limited performance and has been scaled to megawatt class.

In one embodiment, the high power laser utilizes an exit beam of considerable size to reduce heating issues in system optics. The beam is focused at a distance on the threat. The focusing system requires knowledge of the distance to the threat which is uniquely available from ultra wideband radar. UWB radar can determine the distance to the threat to sub meter accuracy, sufficient to focus the laser for maximum heating. Conventional radar with a 1 MHz bandwidth cannot easily measure distance to better than on the order of the 150 meter half wavelength referenced to the bandwidth.

In one exemplary embodiment, the high power laser is focused to a small spot on the threat and focus is maintained from 300 meters range to 30 meters range.

The laser beam is preferably focused at a distance using an exit aperture larger than the focused spot size on the threat. For diffraction-limited optics, a beam with a Gaussian intensity profile can be focused to a spot size in accordance with:

$$D_s = 1.22 \lambda f$$

Where,
$D_s$ is the spot size diameter to the $1/e^2$ intensity points
$\lambda$ is the wavelength
f is the f number or focal distance/aperture diameter Thus, $$D1 = 1.22 \lambda r / Ds$$

Where,
r is the focal distance,
D1 is the aperture diameter
For a laser with a 1 micron wavelength focusing to a 1 cm spot at 300 meters, $$D1 = 1.22 \, (10^{-6})(300)/(10^{-2}) = 3 \text{ cm}$$

Thus, an ideal 3 cm diameter exit beam could be focused to a 1 cm spot at 300 meters. In practice, a laser will not be ideal. Many types of high power lasers may be multimode or the beam may be derived from several lasers in combination. Thus, the exit beam size for this example may range from slightly larger than 3 cm to several times 3 cm. As the threat approaches closer, the optical f number decreases resulting in a decreased the spot size; thereby, increasing the energy density of the spot on the threat. Thus, a system designed for closer ranges may use a smaller optical system or may take advantage of the smaller spot on the target.

In one embodiment of the invention, the high power laser is mounted on the frame of the vehicle and a gimbaled mirror is used to direct the laser beam.

In another embodiment of the invention, the high power laser head is mounted on a gimbal to allow rotation in two coordinates. A monitor scope may be mounted parallel to the laser to monitor the reflection of the laser from the threat to aid in tracking and focusing the laser. One advantage of mounting the laser directly on a gimbal is that the laser is inertially stable, i.e. if the vehicle turns or rocks, the laser requires no torque or motion to counter the vehicle motion; whereas, a gimbaled mirror based system has to move the mirror to subtract vehicle motion. A further advantage of the direct gimbal mounting of the laser is that no additional optics need to be in the beam of the high power laser, reducing cleanliness and corrosion issues. To further eliminate transmission optics from the laser path, the exit window may be opened for the 1 second or so that the laser is used on full power, eliminating all optics in the path of the laser.

In a further embodiment, the laser head may be mounted on an ineitially stabilized gimbaled platform for motion and vibration isolation. The beam is then steered using a gimbaled mirror, also mounted on the gimbaled platform.

Tracking

Optical tracking begins with acquisition. Initially, the UWB radar provides approximate threat position information. The initial error in the approximate threat position may be larger than the beam of the optical tracker. Thus the optical tracker typically performs a search to find the threat within the expected region indicated by the UWB radar. Search strategies may include a raster scan, a spiral scan, a defocused beam, or a combination. Once the threat is found, a narrow beam may be directed on the object to track the object. Tracking may be accomplished by dithering the beam in angle to determine position, or by using two beams and balancing the response from each or by other methods. In one embodiment, the high power laser may be used as the optical tracking beam.

Ultra Violet Flash

An ultraviolet flash is an indication of a flame that may be used for preliminary direction of the active protection system to look for an incoming threat. A flash detection system may be constructed using a number of UV detectors covering several sectors or using a UV sensitive CCD or other imaging array and a lens to cover 360 degrees. Detection of a UV flash would indicate the likelihood of a newly launched threat from the associated location or direction. A UV flash would be distinguished from UV solar background by such characteristics as a sudden temporal increase in intensity, a highly localized source, and a specific wave band associated with the threat propellants. Once a UV flash is detected, the radar scanning resources such as RF directivity, sampling time, and computation resources may be directed to the direction of the flash. Further, the mechanical elements including the optical scanner and gimbaled mirror may be directed to the direction of the flash for faster response once the threat is detected.

Using Velocity Information

The UWB may utilize velocity information to increase the sensitivity of the UWB radar for earlier acquisition. The increased sensitivity is accomplished by combining scans in accordance with a known trajectory or trajectory attribute. In this case, the velocity and the incoming direction are used to combine scans for increased sensitivity. The UWB radar may use an expected threat velocity in the absence of a measured threat velocity; however, the Doppler radar can provide a measured velocity to further improve the sensitivity. The technique of increasing the sensitivity of the UWB radar by combining scans is described in pending application Ser. No. 10/856,037 titled: "Apparatus and Method for Detecting Moving Objects" to Fullerton et al, filed May 28, 2004, which is incorporated herein by reference.

Protection of Assets

The invention may be configured to protect a wide variety of assets including stationary assets such as buildings and guard stations as well as mobile assets such as tanks, personnel carriers, freight carriers, aircraft and others.

Typically, the UWB radar and sparse array can benefit from calibration for a particular installation. Calibration is accomplished by placing a simulated threat at various known azimuth angles and distances and inputting the precise values into the system. The system software then measures the position using the radar and compares the radar measured position with the precise position and determines correction factors to be used with future radar measured positions. Once calibrated, the system may be placed into operation.

In the field, the system may be armed or enabled anytime that a threat is deemed likely. Because there is no wide area explosive shrapnel associated with the active protection system, personnel and other vehicles may be placed with minimal concern for operation of the system. Depending on the particular embodiment it may be desirable to keep clear of the plane of operation, 360 degrees around and at the level of the laser. The laser head may be placed at the highest point of a vehicle, keeping the beam above most normal activities.

For operation, the system may be configured with a control console and display. The system operator may be able to set system parameters such as search range or area in order to avoid friendly fire or sensitive areas or avoid areas of high radar clutter or other operational issues.

The system operator may be able to input enemy positions or directions. Alternatively, the system operator may source enemy location information from a command and control source over a network. Detailed enemy location information may be used to focus system resources for maximum effectiveness. Such resources may include radar scanning time and energy and the computing resources necessary to process radar scanning data to detect threats. In addition, mechanical devices such as the gimbaled mirror or other scanning system may be directed to the most probable angle of threat arrival for fastest response.

In one embodiment, the system operator may pinpoint a prospective shooter location using a sighting device and/or may direct the high power laser as an independent weapon.

CONCLUSION

Thus, herein described is an improved active protection system to improve survivability against RPGs and other similar threats without significantly limiting troop formation and movement.

While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements which embody the spirit and scope of the present invention.

What is claimed is:

1. A method for active protection of a resource comprising the steps:
   providing an ultra-wideband (UWB) radar;
   using said UWB radar to search for a threat, said threat being a moving object;
   determining a first location of said threat by combining scans of said UWB radar according to a candidate trajectory;
   providing an optical search device;
   determining a second location of said threat using said optical search device, said second location being determined based on said first location;
   imparting damage to said threat based on said second location of said threat.

2. The method of claim 1, wherein the optical search device initiates an optical search based on said first location of said threat, and said second location of said threat is determined based upon said optical search.

3. The method of claim 1 wherein the UWB radar includes a sparse array antenna.

4. The method of claim 1 wherein the UWB radar includes a synthetic aperture antenna.

5. The method of claim 1 wherein at least one of the first location and the second location is expressed in angle and distance.

6. The method of claim 1 wherein the optical search device and the device imparting damage utilize at least one shared optical element.

7. The method of claim 1 wherein damage is imparted to the threat by a laser.

8. The method of claim 7 wherein the laser is a diode pumped laser.

9. The method of claim 7 wherein the laser is a $CO_2$ laser.

10. The method of claim 7 wherein the laser is a chemical Oxygen-Iodine laser.

11. The method of claim 7 wherein the laser is focused in accordance with range information provided by said UWB radar.

12. The method of claim 1 wherein damage is imparted to the threat by an intercepting device.

13. The method of claim 12 wherein the intercepting device is deployed in accordance with range information from said UWB radar.

14. The method of claim 1 wherein damage is imparted to the threat by a ballistic projectile.

15. The method of claim 14 wherein said ballistic projectile is deployed in accordance with range information from said UWB radar.

16. The method of claim 1 further including the step of determining a source of the threat and initiating action to neutralize the source of the threat.

17. The method of claim 16 wherein said action is to provide the coordinates of the source of the threat to a command and control system.

18. The method of claim 16 wherein said action is to direct a laser toward said source of the threat.

19. The method of claim 16 wherein said action is to direct a weapon toward said source of the threat.

20. A method for active protection of a resource comprising the steps:
   detecting a threat using a Doppler radar, said threat being a moving object;
   determining a threat velocity using said Doppler radar;
   providing an ultra-wideband (UWB) radar;
   providing said threat velocity to said UWB radar;
   using said UWB radar to search for said threat;
   determining a first location of said threat using said UWB radar;
   providing an optical search device;
   determining a second location of said threat using said optical search device, said second location being determined based on said first location; and
   imparting damage to said threat based on said second location of said threat.

21. The method of claim 20 further including a communications link to a command and control authority, said method further comprising the step of providing said threat velocity to said command and control authority through said communications link.

22. A system for protecting a resource, said system comprising:
   a UWB radar for detecting a threat;
   an optical tracking device for precision location of said threat; and
   a threat kill device, wherein the threat kill device is a laser, wherein the laser and optical tracking device utilize at least one shared optical element.

23. The system of claim 22 wherein the shared optical element is a mirror.

24. The system of claim 23 wherein the mirror is mounted on a gimbal.

25. The system of claim 22 wherein the laser is a diode pumped laser.

26. The system of claim 22 wherein the laser is a $CO_2$ laser.

27. The system of claim 22 wherein the laser is a chemical Oxygen-Iodine laser.

28. The system of claim 22 wherein the laser is focused in accordance with range information from said UWB radar.

29. The system of claim 22 wherein the UWB radar includes a sparse array antenna.

30. A system for protecting a resource, said system comprising:
   a UWB radar for detecting a threat;
   an optical tracking device for precision location of said threat; and
   a threat kill device, wherein the threat kill device is a laser, wherein said laser is focused using a flexible mirror.

31. The system of claim 30 wherein said flexible mirror is flexed by a fluid.

32. A system for protecting a resource, said system comprising:
   a UWB radar for detecting a threat;
   an optical tracking subsystem for precision location of said threat; and
   a threat kill device, wherein the UWB radar includes a scanner and scan combiner and combines scans according to a candidate trajectory to enhance detectability of the threat.

* * * * *